United States Patent
Sukumar et al.

(10) Patent No.: US 9,762,482 B2
(45) Date of Patent: Sep. 12, 2017

(54) SMART PROCESSING OF WWAN PACKETS TRANSMITTED OVER WLAN

(71) Applicant: QUALCOMM Incorporated, San Diego, CA (US)

(72) Inventors: Hariharan Sukumar, San Diego, CA (US); Vaibhav Kumar, Encinitas, CA (US); Alok Mitra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 14/813,579

(22) Filed: Jul. 30, 2015

(65) Prior Publication Data
US 2017/0034054 A1 Feb. 2, 2017

(51) Int. Cl.
*H04L 12/721* (2013.01)
*H04W 4/02* (2009.01)
*H04L 5/00* (2006.01)
*H04W 84/12* (2009.01)

(52) U.S. Cl.
CPC .............. *H04L 45/66* (2013.01); *H04L 5/003* (2013.01); *H04W 4/02* (2013.01); *H04W 84/12* (2013.01)

(58) Field of Classification Search
CPC .......... H04L 45/66; H04L 5/003; H04W 4/02; H04W 84/12
USPC ........................................ 370/310, 328, 338
See application file for complete search history.

(56) References Cited

U.S. PATENT DOCUMENTS

| | | | |
|---|---|---|---|
| 2013/0102313 A1* | 4/2013 | Tinnakornsrisuphap | H04W 36/22 455/436 |
| 2013/0201890 A1 | 8/2013 | Swaminathan et al. | |
| 2014/0140287 A1* | 5/2014 | Cheng | H04W 76/02 370/329 |
| 2014/0171087 A1* | 6/2014 | Murari | H04W 52/0254 455/437 |
| 2014/0307622 A1 | 10/2014 | Horn et al. | |

OTHER PUBLICATIONS

Alcatel: "Mobility between pre-SAE/LTE 3GPP and 3GPP I-WLAN access system", 3GPP TSG SA WG2 Architecture—S2#SAEdHoc; S2H060454_CR_MOBILITY IWLAN, 3$^{RD}$ Generation Partnership Project (3GPP), Mobile Competence Centre; 650, Route Des Lucioles; F-06921 Sophia-Antipolis Cedex ; France, val. SA WG2, No. Paris; Apr. 3, 2006, Apr. 3, 2006 (Apr. 3, 2006), XP050229245, 15 pages.[retrieved on Apr. 3, 2006].

(Continued)

*Primary Examiner* — Obaidul Huq
(74) *Attorney, Agent, or Firm* — Patterson & Sheridan, L.L.P

(57) ABSTRACT

Certain aspects of the present disclosure relate to smart processing of wireless wide area network (WWAN) packets transmitted over wireless local area network (WLAN). According to certain aspects, a method for wireless communications by a user equipment (UE) capable of communicating via at least first and second radio access technologies (RATs) is provided. The method generally includes dynamically switching to a location, within the UE, as an anchor point for processing packets based, at least in part, on operating states of the first and second RATs and routing packets received via at least one of the first and second RATs to the dynamically switched location of the anchor point.

26 Claims, 25 Drawing Sheets

(56) References Cited

OTHER PUBLICATIONS

International Search Report and Written Opinion—PCT/US2016/033439—ISA/EPO—dated Aug. 2, 2016.
Nokia Siemens Networks., et al., "Clarification of GW functions in Relay Architecture", 3GPP TSG SA WG#84 ; S2-111651 (LTE_RELAY_GWFUNCTIONS_DISC)V4, 3rd Generation Partnership Project (3GPP), Mobile Competence Centre ; 650, Route Des Lucioles ; F-06921 Sophia-Antipolis Cedex ; France, val. SA WG2, No. Bratislava; Apr. 11, 2011, Apr. 6, 2011 (Apr. 6, 2011), XP050524565, 4 pages. [retrieved on Apr. 6, 2011].

* cited by examiner

| Active RAT | | Data Sink Location | | Direct Connection | | Higher Efficiency | | Another Location |
|---|---|---|---|---|---|---|---|---|
| eNB | WLAN AP | Application Processor | Tethered Device | WLAN to Modem Processor | Modem Processor to Tethered Device | Modem Processor | Application Processor | |
| True | X | X | X | X | X | X | X | |
| False | True | True | X | X | X | X | X | MDM |
| False | True | False | True | X | False | X | X | AP |
| False | True | False | True | False | X | X | X | AP |
| False | True | False | True | True | True | True | False | MDM |
| False | True | False | True | True | True | False | True | AP |

| LTE active | WLAN active | DS in AP | DS in TE | WLAN -> MDM | MDM -> TE | MDM efficient | AP efficient | Anchor location | Comment/Reason |
|---|---|---|---|---|---|---|---|---|---|
| FALSE | TRUE | TRUE | X | X | X | X | X | AP | since AP has to be up as it is the sink |

| LTE active | WLAN active | DS in AP | DS in TE | WLAN -> MDM | MDM -> TE | MDM efficient | AP efficient | Anchor location | Comment/Reason |
|---|---|---|---|---|---|---|---|---|---|
| FALSE | TRUE | FALSE | TRUE | TRUE | TRUE | TRUE | FALSE | MDM | based on efficiency alone |

*FIG. 21B*

SMART PROCESSING OF WWAN PACKETS TRANSMITTED OVER WLAN

BACKGROUND

Field of the Disclosure

Aspects of the present disclosure relate generally to wireless communication systems, and more particularly, to smart processing of wireless wide area network (WWAN) packets transmitted over wireless local area network (WLAN).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for smart processing of wireless wide area network (WWAN) packets (e.g., long term evolution (LTE) packets) transmitted over wireless local area network (WLAN) interface (e.g., a WiFi interface) are described herein.

In an aspect, a method for wireless communications by a user equipment (UE) capable of communicating via at least first and second radio access technologies (RATs) is provided. The method generally includes dynamically switching a location, within the UE, as an anchor point for processing packets based, at least in part, on operating states of the first and second RATs, and routing packets received via at least one of the first and second RATs to the dynamically selected location of the anchor point.

In another aspect, an apparatus for wireless communications by a UE capable of communicating via at least first and second RATs is provided. The apparatus generally includes at least one processor configured to: dynamically switch to a location, within the UE, as an anchor point for processing packets based, at least in part, on operating states of the first and second RATs, and route packets received via at least one of the first and second RATs to the dynamically switched location of the anchor point; and a memory coupled with the at least one processor.

In yet another aspect, an apparatus for wireless communications by a UE capable of communicating via at least first and second RATs is provided. The apparatus generally includes means for dynamically switching a location, within the UE, as an anchor point for processing packets based, at least in part, on operating states of the first and second RATs, and means for routing packets received via at least one of the first and second RATs to the dynamically selected location of the anchor point.

In yet another aspect, a computer-readable medium having instructions stored thereon, the instructions executable by a processor for wireless communications by a UE capable of communicating via at least first and second RATs. The instructions generally include instructions for dynamically switching a location, within the UE, as an anchor point for processing packets based, at least in part, on operating states of the first and second RATs, and routing packets received via at least one of the first and second RATs to the dynamically selected location of the anchor point.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 21 is an example truth table showing conditions for switching anchor point locations, in accordance with certain aspects of the present disclosure;

FIG. 21A is an example truth table showing initial conditions and anchor point location, in accordance with certain aspects of the present disclosure;

FIG. 21B is an example truth table showing a soft change in conditions for switching anchor point locations, in accordance with certain aspects of the present disclosure;

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
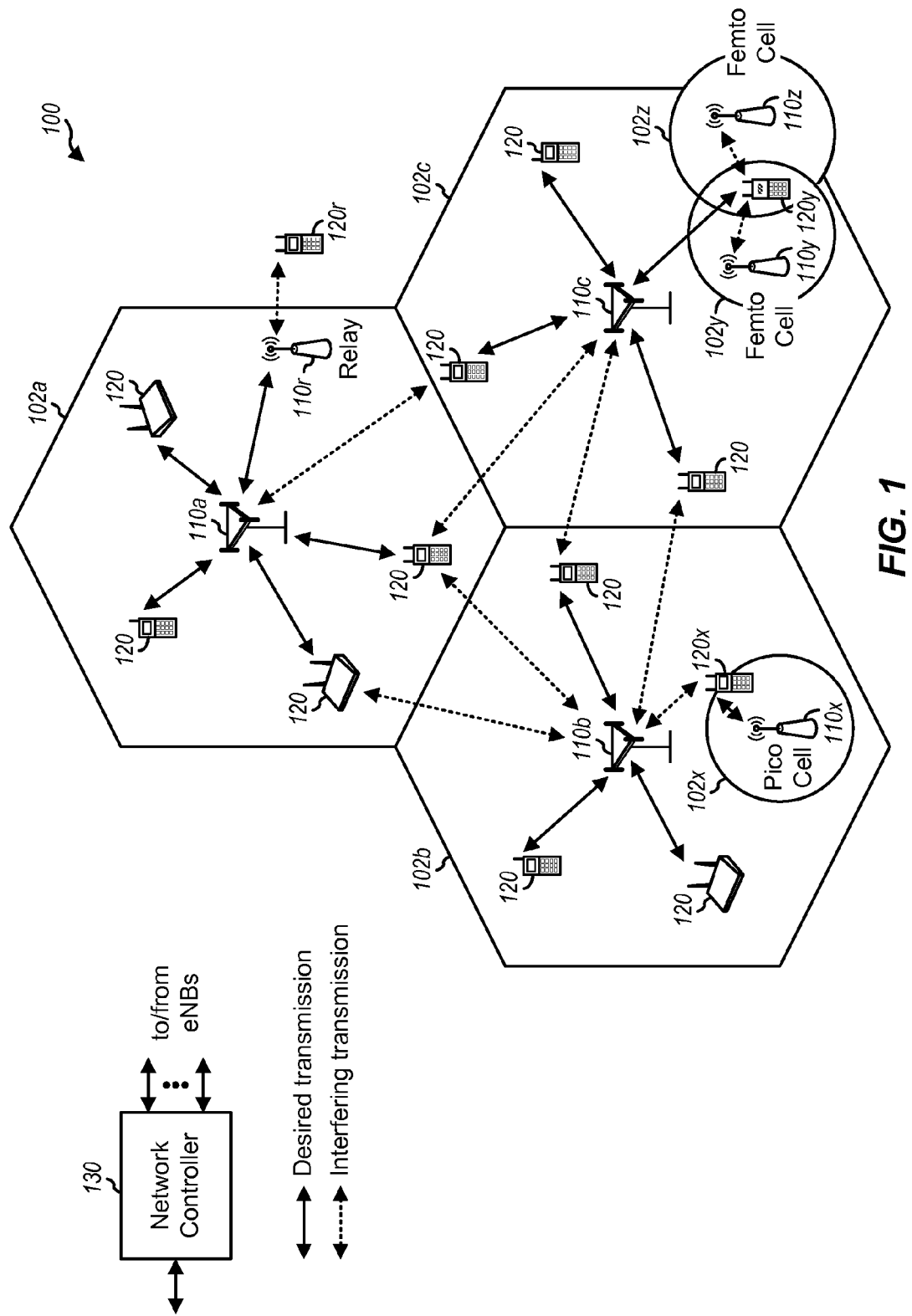
FIG. 1 is a block diagram conceptually illustrating an example of a telecommunications system, in accordance with certain aspects of the present disclosure.

Techniques for smart processing of wireless wide area network (WWAN) packets (e.g., long term evolution (LTE) packets) transmitted over wireless local area network (WLAN) interface (e.g., a WiFi interface) are described herein. According to certain aspects, a user equipment (UE) capable of communicating via at least first and second radio access technologies (RATs) may dynamically switch to a location, within the UE, as an anchor point for processing packet data convergence protocol (PDCP) data packets based, at least in part, on operating states of the first and second RATs (e.g., the destination of the data packets, the direct connection between the location of the anchor point and the destination of the data packets, efficiency, etc.). The location of the anchor point may be dynamically switched between the modem processor and the applications processor, within the UE, using inter-processor communication between the modem processor and the applications processor. The UE may route packets received via at least one of the first and second RATs to the dynamically switched location of the anchor point.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

An Example Wireless Communications System

FIG. 1 shows a wireless communication network 100, in which aspects of the present disclosure may be performed.

For example, the UE 120 may be capable of communicating via at least a first eNB 110*a* and a second eNB 110*b* and may receive data packets from at least eNB 110*a* and eNB 110*b*. The UE 120 may dynamically switch a location, within the UE 120, as an anchor point for processing the data packets received from the eNB 110 (e.g., based on the various operating parameters). The UE 120 may route packets received from eNB 110 to the dynamically switched location of the anchor point.

The wireless communications network 100 may be, for example, an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110*a*, 110*b* and 110*c* may be macro eNodeBs for the macro cells 102*a*, 102*b* and 102*c*, respectively. The eNodeB 110*x* may be a pico eNodeB for a pico cell 102*x*. The eNodeBs 110*y* and 110*z* may be femto eNodeBs for the femto cells 102*y* and 102*z*, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110*r* may communicate with the eNodeB 110*a* and a UE 120*r* in order to facilitate communication between the eNodeB 110*a* and the UE 120*r*. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
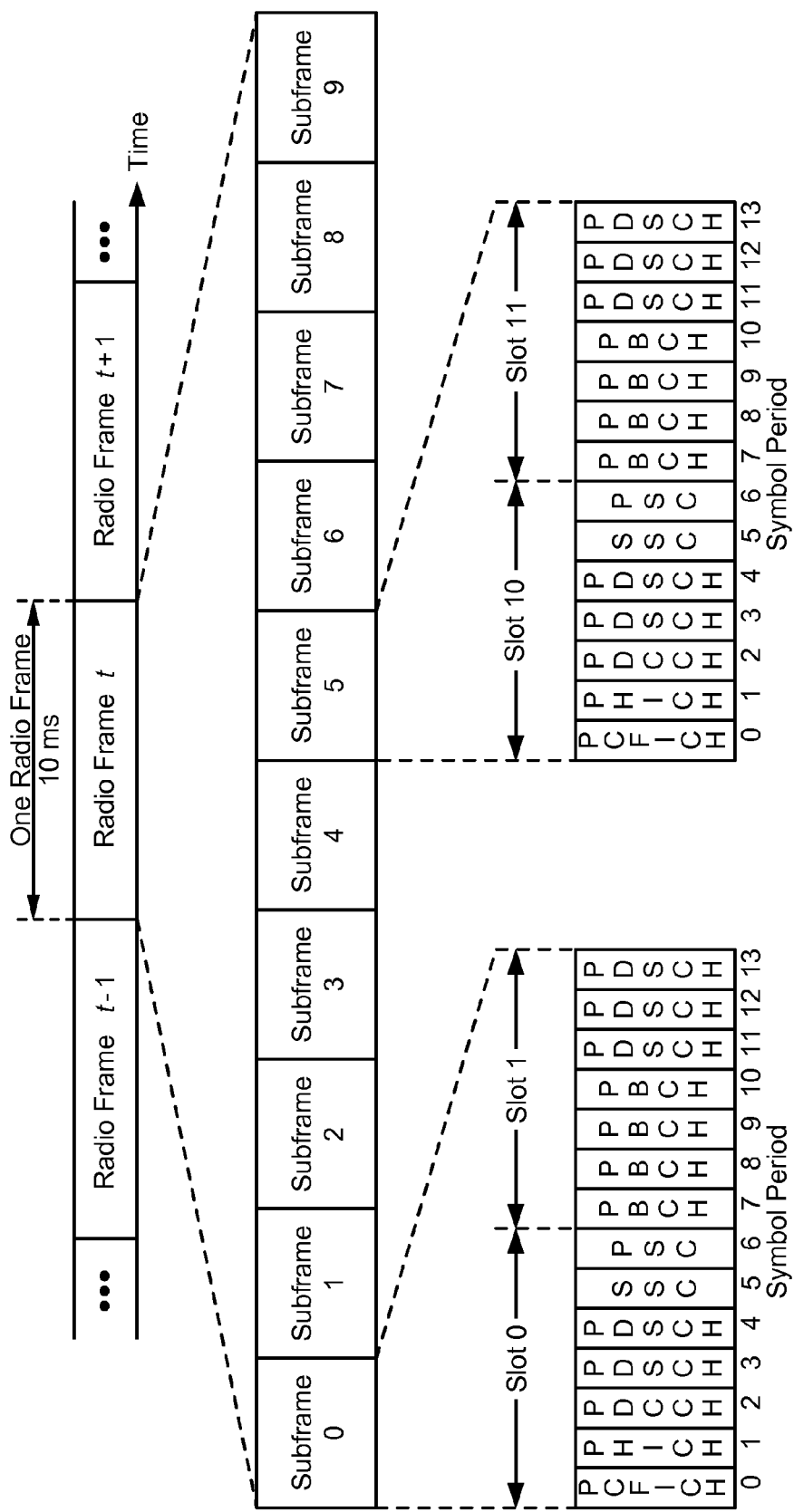
FIG. 2 is a block diagram conceptually illustrating an example of a downlink frame structure in a telecommunications system, in accordance with certain aspects of the present disclosure.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of sub-frame 0. The PBCH may carry certain system information.

The eNodeB may send a Physical Control Format Indicator Channel (PCFICH) in a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not .shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Certain combinations of REGs may be used for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
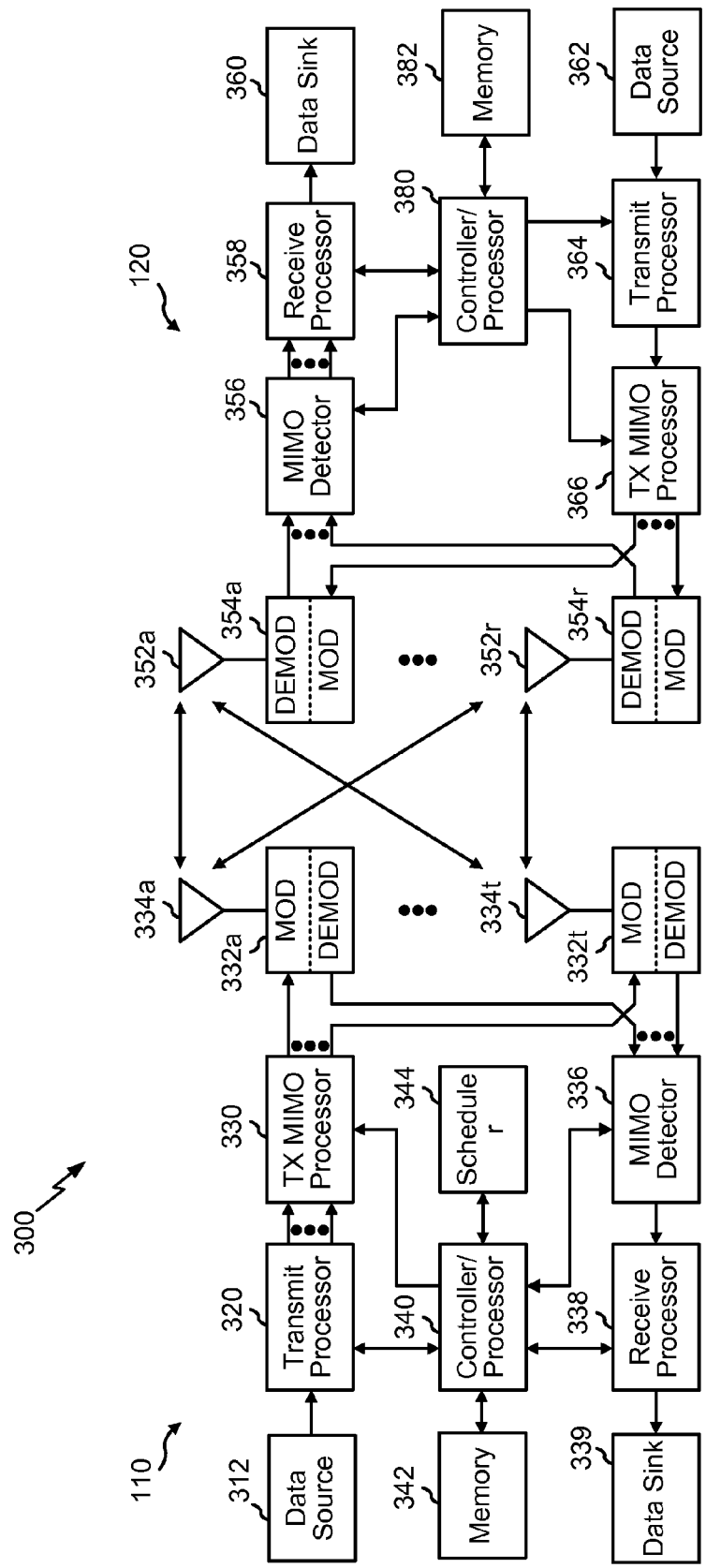
FIG. 3 is a block diagram conceptually illustrating a design of an e Node B (eNB) and a user equipment (UE) configured, in accordance with certain aspects of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct, e.g., the execution of various processes for the techniques described herein. The processor 380 and/or other processors and modules at the UE 120 may also perform or direct, e.g., the execution of the functional blocks illustrated in FIG. 7, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the base station 110 includes means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the controller/processor 340, the memory 342, the transmit processor 320, the modulators 332, and the antennas 334 configured to perform the functions recited by the aforementioned means. In another aspect, the aforementioned means may be a module or any apparatus configured to perform the functions recited by the aforementioned means. In one configuration, the UE 120 includes means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the controller/processor 380, the memory 382, the receive processor 358, the MIMO detector 356, the demodulators 354, and the antennas 352 configured to perform the functions recited by the aforementioned means. In another aspect, the aforementioned means may be a module or any apparatus configured to perform the functions recited by the aforementioned means.

Figure 4:
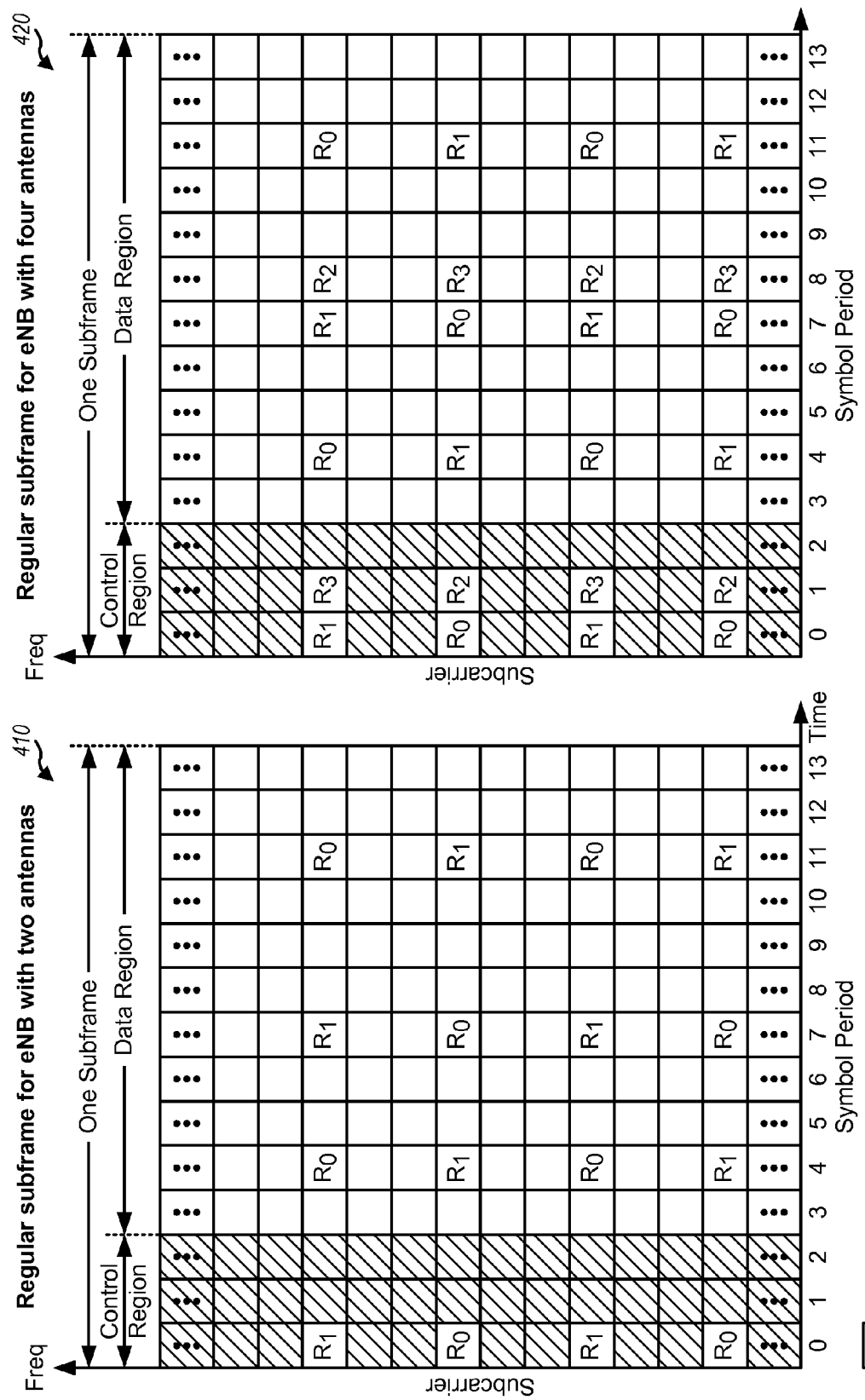
FIG. 4 illustrates an example subframe resource element mapping, in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Carrier Aggregation

Figure 5:
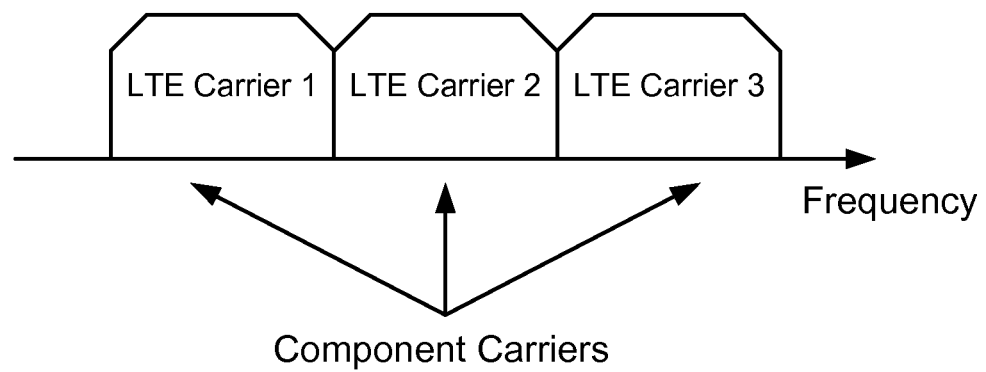
FIG. 5 discloses a continuous carrier aggregation type, in accordance with certain aspects of the present disclosure.
Figure 6:
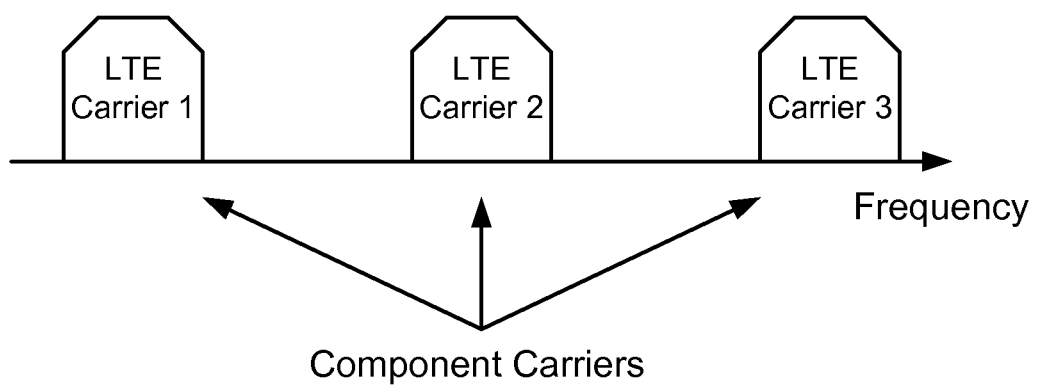
FIG. 6 discloses a non-continuous carrier aggregation type, in accordance with certain aspects of the present disclosure.
Figure 7:
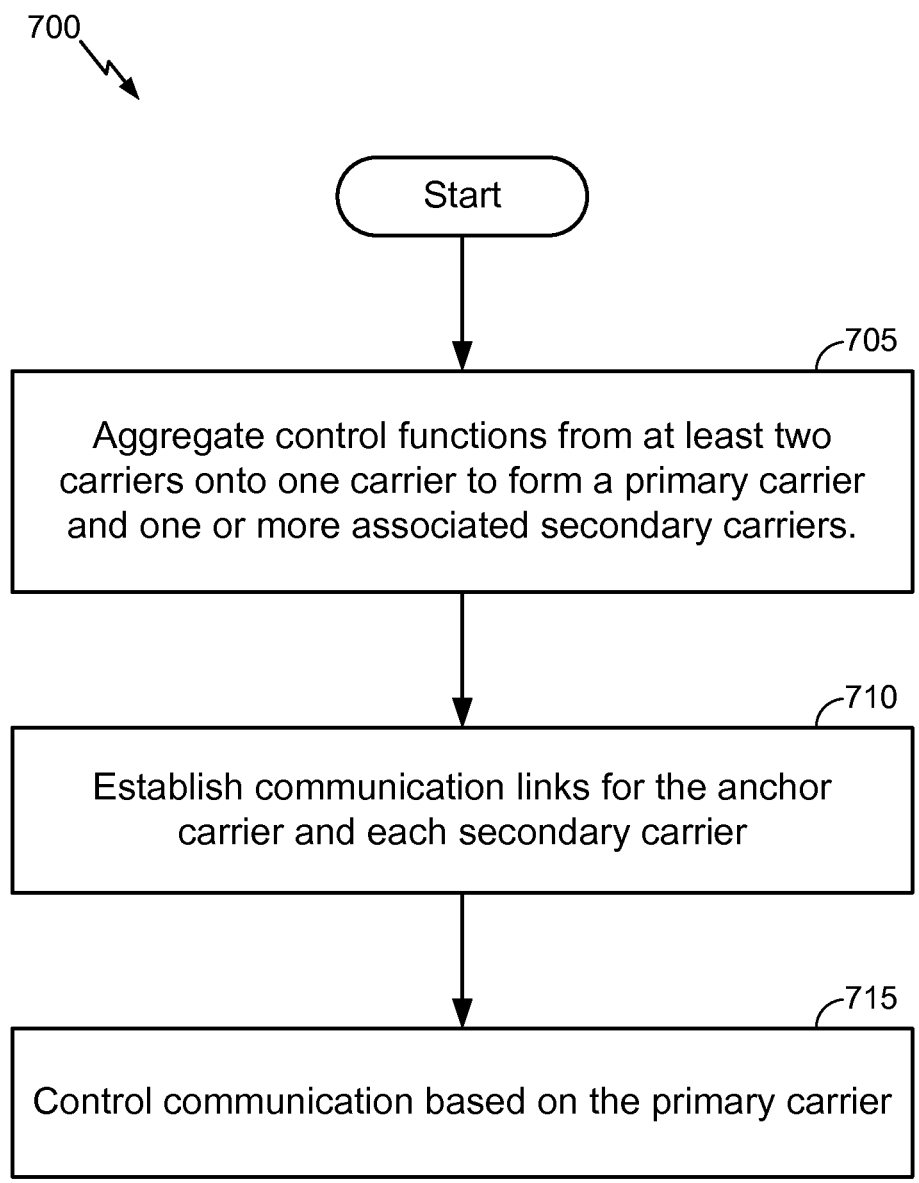
FIG. 7 is a block diagram illustrating a method for controlling radio links in multiple carrier configurations, in accordance with certain aspects of the present disclosure.

LTE-Advanced UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA. They are illustrated in FIGS. 5 and 6. Continuous CA occurs when multiple available component carriers are adjacent to each other (FIG. 5). On the other hand, non-continuous CA occurs when multiple available component carriers are separated along the frequency band (FIG. 6). Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. Next at block, 710, communication links are established for the primary carrier and each secondary carrier. Then, communication is controlled based on the primary carrier in block 715.

Mutliflow

Figure 8:
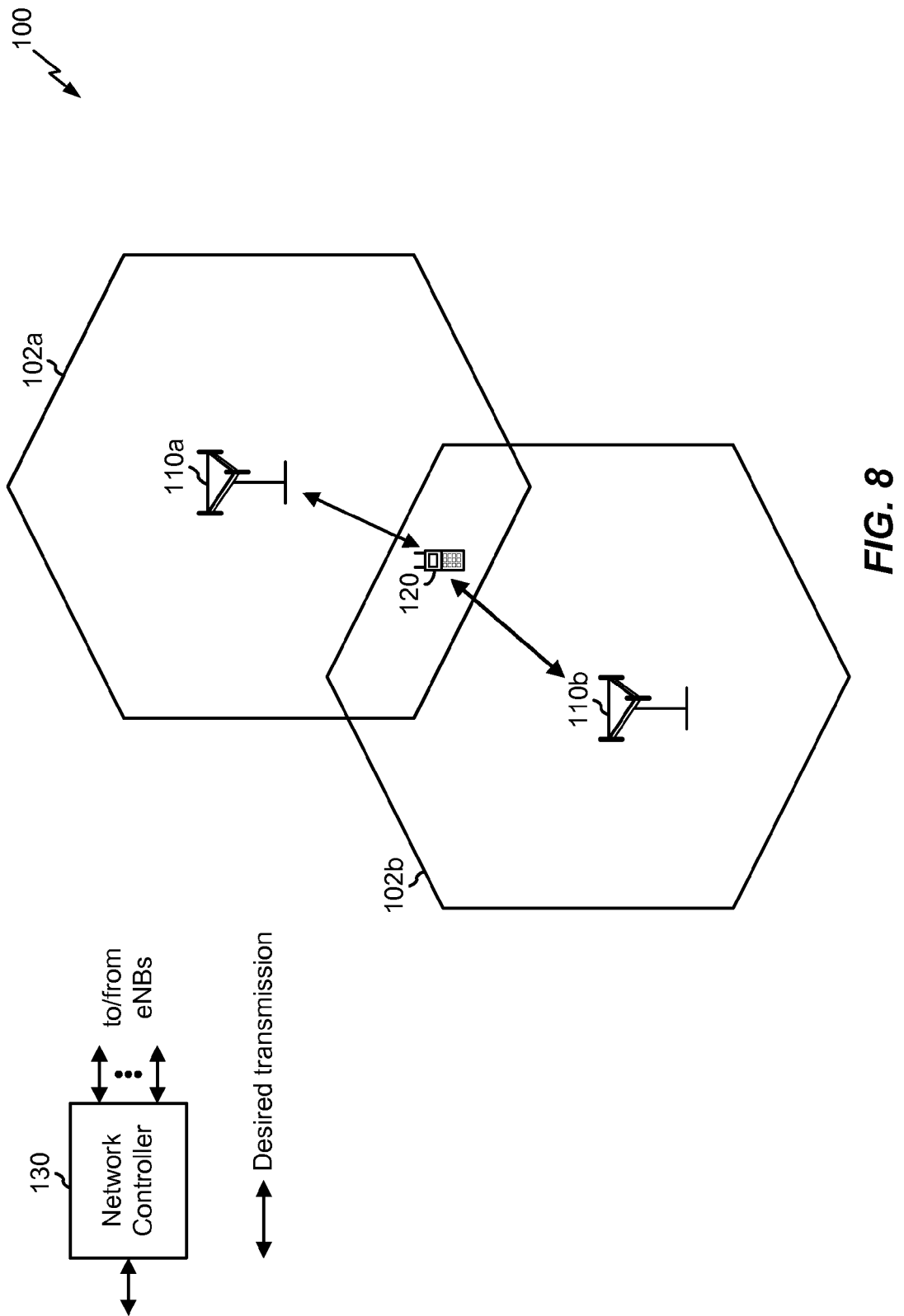
FIG. 8 illustrates using multiflow to deliver simultaneous data streams, in accordance with certain aspects of the present disclosure.

Presently, UEs receive data from one eNodeB. However, users on a cell edge may experience high inter-cell interference which may limit the data rates. Multiflow allows users to receive data from two eNodeBs simultaneously. It works by sending and receiving data from the two eNodeBs in two totally separate streams when a UE is in range of two cell towers in two adjacent cells at the same time. The UE talks to two towers simultaneously when the device is on the edge of either towers' reach (see FIG. 8). By scheduling two independent data streams to the mobile device from two different NodeBs at the same time, multiflow exploits uneven loading in HSPA networks. This helps improve the cell edge user experience while increasing network capacity. In one example, throughput data speeds for users at a cell edge may double. "Multiflow" is similar to dual-carrier HSPA, however, there are differences. For example, dual-carrier HSPA doesn't allow for connectivity to multiple towers to connect simultaneously to a device.

New Carrier Type

Previously, with LTE-A standardization carriers were backward-compatible, which enabled a smooth transition to new releases. However, this meant that the carriers continuously transmitted common reference signals (CRS), also referred to as cell-specific reference signals, in every subframe across the bandwidth. Most cell site energy consumption is caused by the power amplifier since the cell remains on even when limited control signalling is being transmitted, causing the amplifier to continue to consume energy. CRS were introduced in release 8 of LTE and are LTE's most basic downlink reference signal. They are transmitted in every resource block in the frequency domain and in every downlink subframe. CRS in a cell can be for one, two, or four corresponding antenna ports. CRS may be used by remote terminals to estimate channels for coherent demodulation. A new carrier type allows temporarily switching off of cells by removing transmission of CRS in four out of five sub frames. This reduces power consumed by the power amplifier. It also reduces the overhead and interference from CRS since the CRS won't be continuously transmitted in every subframe across the bandwidth. In addition, the new carrier type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

LTE Plus Wi-Fi

With, WiFi Offload, the basic idea is whenever a WLAN access point is available, some or all of the traffic is routed through the WLAN access point, thus offloading the cellular access. Mobile operators should be able to control which traffic is routed over WLAN and which one is kept on 3G/4G. For example, some IP flows (e.g., related to VoIP or other operators' services) can be maintained over 3G/4G to leverage its QoS capabilities, while IP flows related to "best-effort" Internet traffic can be offloaded to WLAN. 3GPP introduced a Wi-Fi mobility framework in Release 8 to enable seamless handover between 3G/4G and WLAN.

With interworking, the performance of each of the available links is estimated on a real-time basis, without any user intervention, and the best possible link for the type of application the user is trying to use is selected. The performance estimation looks at a multitude of parameters from an end-to-end perspective, covering not only the last-mile air link to the users, but also all the way back to the Internet. Some of the parameters considered for the decision include signal quality, available bandwidth, speed of the Internet connectivity, latency, as well as the operator policies regarding which apps/services are allowed to be moved to Wi-Fi and which are restricted to 3G/4G. So, the device continuously determines the most appropriate link and switches between 3G/4G and Wi-Fi.

Figure 9:
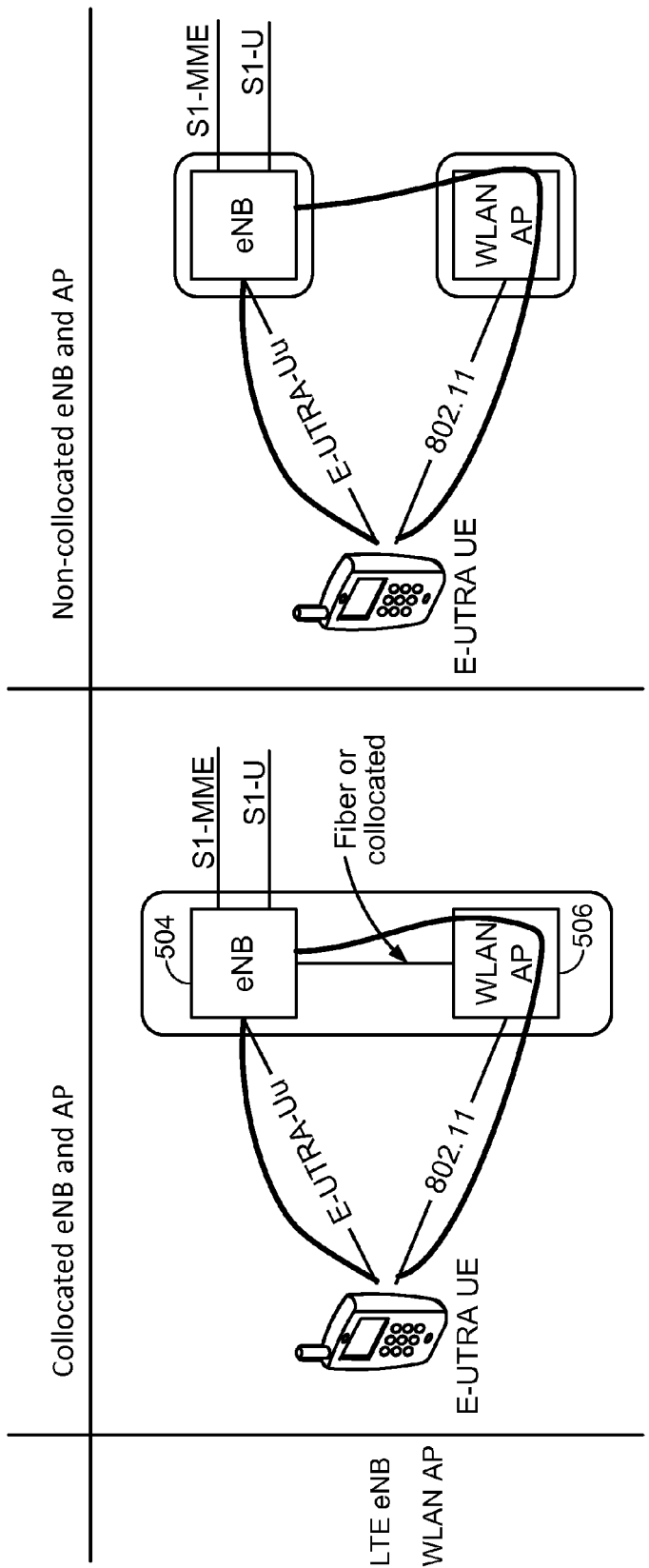
FIG. 9 illustrates two reference cellular-WLAN interworking architectures for a wireless local area network (WLAN) and a 3GPP eNB with disjoint bearer routing, in accordance with certain aspects of the present disclosure.

According to certain aspects, a user may be simultaneously connected to an LTE eNB and a Wi-Fi AP, which provide radio access links to transport a user's signaling and data traffic, as shown in FIG. 9. The eNB and the AP may be collocated or non-collocated. A user's data or signaling bearer may be served by either LTE or WiFi radio links. A bearer establishes a "virtual" connection between two endpoints so that traffic can be sent between them. It acts as a pipeline between the two endpoints. Access to PDN services and associated applications is provided to a UE by EPS bearers. A Default Bearer is typically is established during attachment and maintained throughout the lifetime of the connection. A dedicated bearer is used if the end-user uses connectivity to a different Packet Data Network (PDN) to that provided by the default bearer, or if the end-user uses a different Quality of Service (QoS) to that offered by the default bearer. Dedicated bearers are configured to run in parallel to the existing default bearer.

According to certain aspects, a UE simultaneously connected to an LTE eNB and a Wi-Fi AP may perform offloading, within the UE, by dynamically switching a location of an anchor point for PDCP processing of packets transmitted over the WLAN.

Example Methods of Smart Processing of WWAN Packets Transmitted Over WLAN

Techniques for smart processing of wireless wide area network (WWAN) packets (e.g., long term evolution (LTE) packets) transmitted over wireless local area network (WLAN) interface (e.g., a WiFi interface) are described herein. According to certain aspects, a user equipment (UE) capable of communicating via at least first and second radio access technologies (RATs) may dynamically switch to a location, within the UE, as an anchor point for processing packet data convergence protocol (PDCP) data packets based, at least in part, on operating states of the first and second RATs (e.g., the destination of the data packets, the direct connection between the location of the anchor point and the destination of the data packets, efficiency, etc. . . . ). The location of the anchor point may be dynamically switched between the modem processor (e.g., a baseband processor) and the applications processor, within the UE, using inter-processor communication between the modem processor and the applications processor. The UE may route packets received via at least one of the first and second RATs to the dynamically switched location of the anchor point.

A WLAN air interface is presently being considered as a carrier for WWAN data packets. Currently, when data packets are received by a UE (e.g., UE 502) from a base station (BS) through the WLAN air interface, the data packets are first transmitted to the modem processor and then to the location of the data sink (the intended destination of the data packets), for example, for long term evolution (LTE) packets, the sink may be in the Applications processor of the UE. This may cause significant bus bandwidth utilization and/or increased power consumption. For example, if the sink of the packets is in the applications processor, and if the packets are being received on the WLAN interface, the modem processor is kept up for the purpose of processing the PDCP packets. This increases the power consumption in the device. For example, if only WiFi is active and the modem processor is not receiving LTE packets, then the reason the packets are sent to the LTE modem is to be PDCP processed and then sent to the original destination. Transporting packets from the WiFi leg to the LTE modem processor and back may cause significant loading on the buses and on the double data rate (DDR) on-chip memory. The novel method and apparatus discussed herein, proposes that by knowing where the destination of the packets is, the packets need not be transferred to the modem processor first, instead, the packets may be routed directly to the applications processor, in some cases.

As shown in FIGS. 10-13, if packets are received over the WWAN interface, the modem processor is kept up for processing the packets.

As used herein, a "sink" or "data sink" may refer to a device or part of a device, that receives data or that is the intended destination for the data. In the examples herein, the sink is typically in the UE, a particular processor within the UE (e.g., such as an applications processor or a modem processor), or a tethered equipment to the UE. The location of the sink may be dependent on the type of the data.

As used herein, "anchor point" or "anchor" may refer to a device, a location within a device, or part of a device at which data received by the device is first sent for processing/ordering. In the example discussed here, the device is typically a UE and the anchor is within one of the processors of the UE, such as the applications processor or the modem processor.

Figure 10:
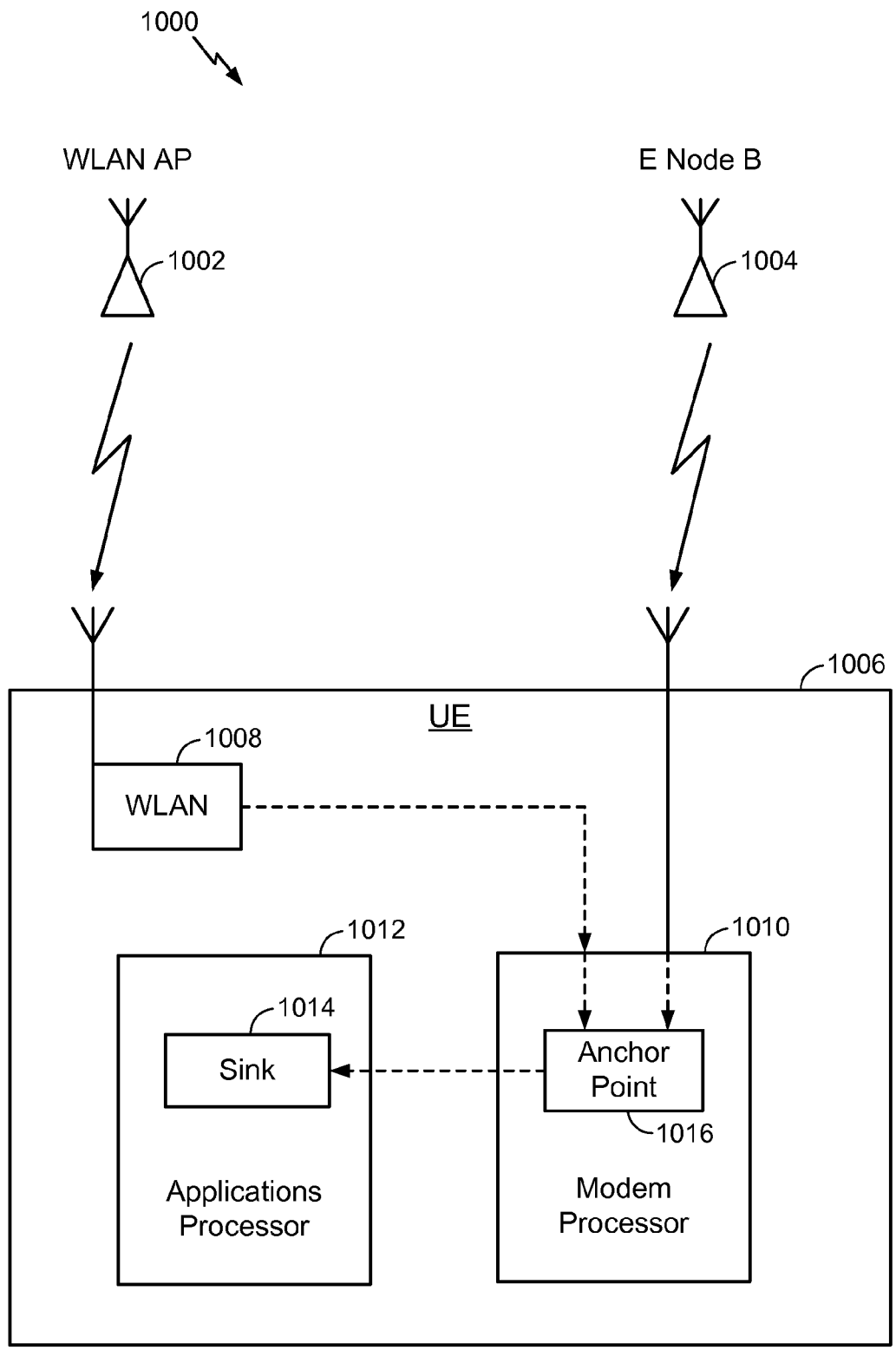
FIG. 10 illustrates a data path in which the UE receives data packets from the wireless wide area network (WWAN) and WLAN, where the data sink is located at the Applications processor.

FIG. 10 illustrates a data path 1000 in which the UE 1006 receives data packets from first and second RATs, for example a WLAN AP 1002 and an evolved Node B (eNB) 1004 (e.g., in a WWAN), where the data sink is located in the Applications processor. As shown in FIG. 10, both WLAN and WWAN RATs are actively communicating with the UE 1006. Data packets from eNB 1004 are routed to the anchor point 1016 located at the modem processor 1010. Data packets from the WLAN AP 1002 are received by the UE 1006 at the WLAN air interface 1008 and also routed to the modem processor 1010 for the purpose of processing/reordering the data packets. The data packets are then routed to the location of the data sink 1014, in this case, located at the applications processor 1012. In this scenario, both the applications processor 1012 and modem processor 1010 may remain awake.

Figure 11:
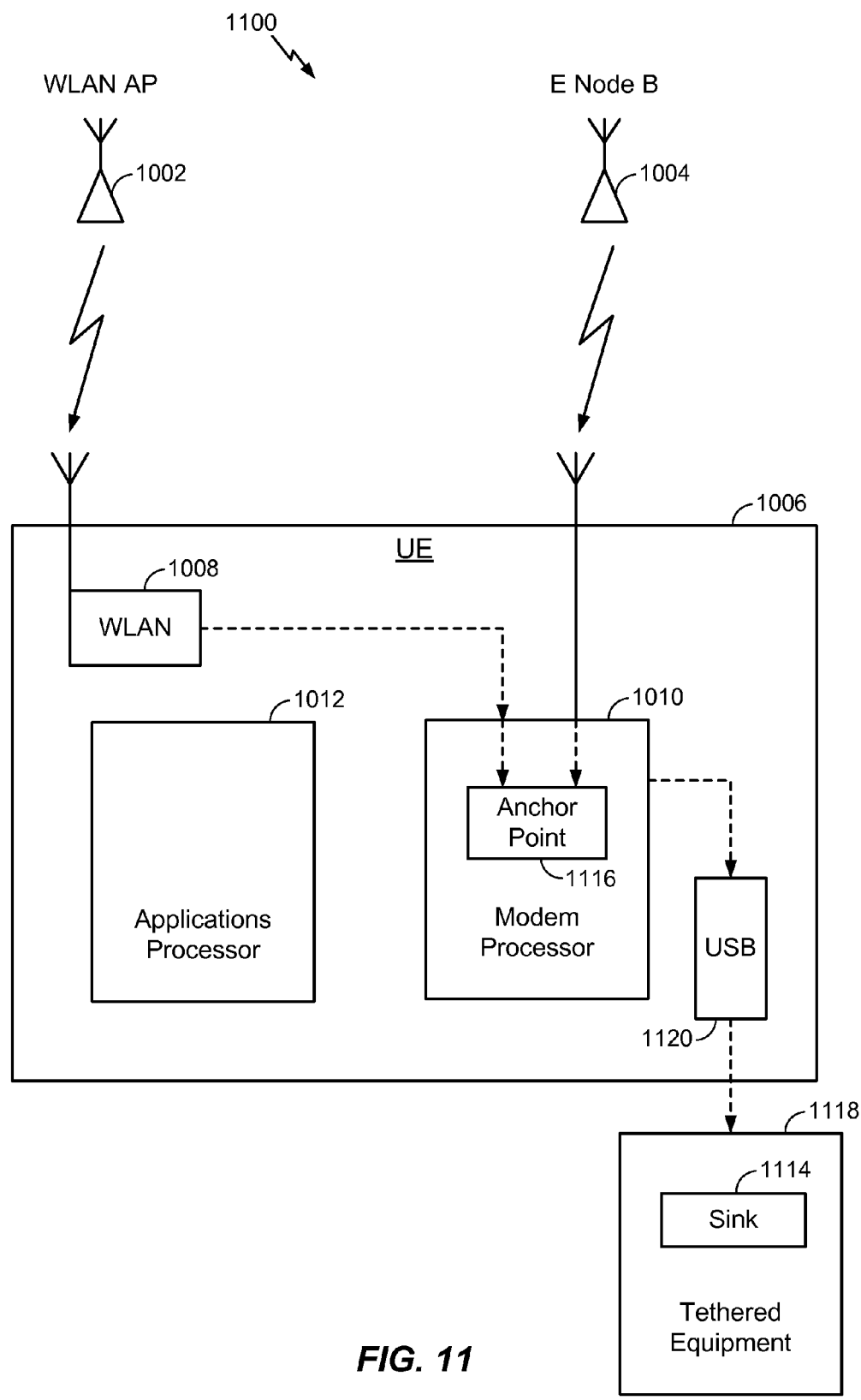
FIG. 11 illustrates a data path in which the UE receives data packets from the WWAN and WLAN, where the data sink is located at the device tethered.

FIG. 11 illustrates a data path 1100 in which the UE 1006 receives data packets from the WLAN AP 1002 and the eNB 1004, where the data sink 1114 is located in the tethered equipment 1118. WiFi-only devices (e.g., iPADs, laptops, e-books, and iPod touches) can use tethering to access the Internet even though there is no WiFi access point (AP) in the neighborhood. One way to access the Internet is to use a smartphone as a mobile AP (MAP). The MAP may utilize its 3G/LTE interface to access the Internet. The tethered equipment 1118 may be a device tethered to the UE 1006, which may be acting as a hotspot for the tethered equipment, for example, via a USB interface, Bluetooth, WiFi interface, high speed inter-chip (HSIC), peripheral component interconnect express (PCIe), secure digital input/output (SDIO), or other interface. As shown in FIG. 11, both the first and second RATs (WLAN AP 1002 and eNB 1004) are active. Data packets from the WLAN AP 1002 may be received by the UE 1006 at the WLAN air interface 1008 and forwarded to the anchor point 1116 at the modem processor 1010. Data from the eNB 1004 is also routed to the modem processor 1010. Since the data sink 1114 is in the tethered equipment 1118, the data packets may then be routed from the modem processor 1010 to the tethered equipment 1118 (e.g., via USB interface 1120). The direct connection from the modem processor 1010 to the device tethered 1118 to the UE 1006 allows the data packets to bypass the applications processor 1012. In this scenario, the applications processor 1012 may be collapsed when not in use due to other traffic or user activity. Alternatively, the applications processor 1012 may remain on due to other traffic or due to user activity.

Figure 12:
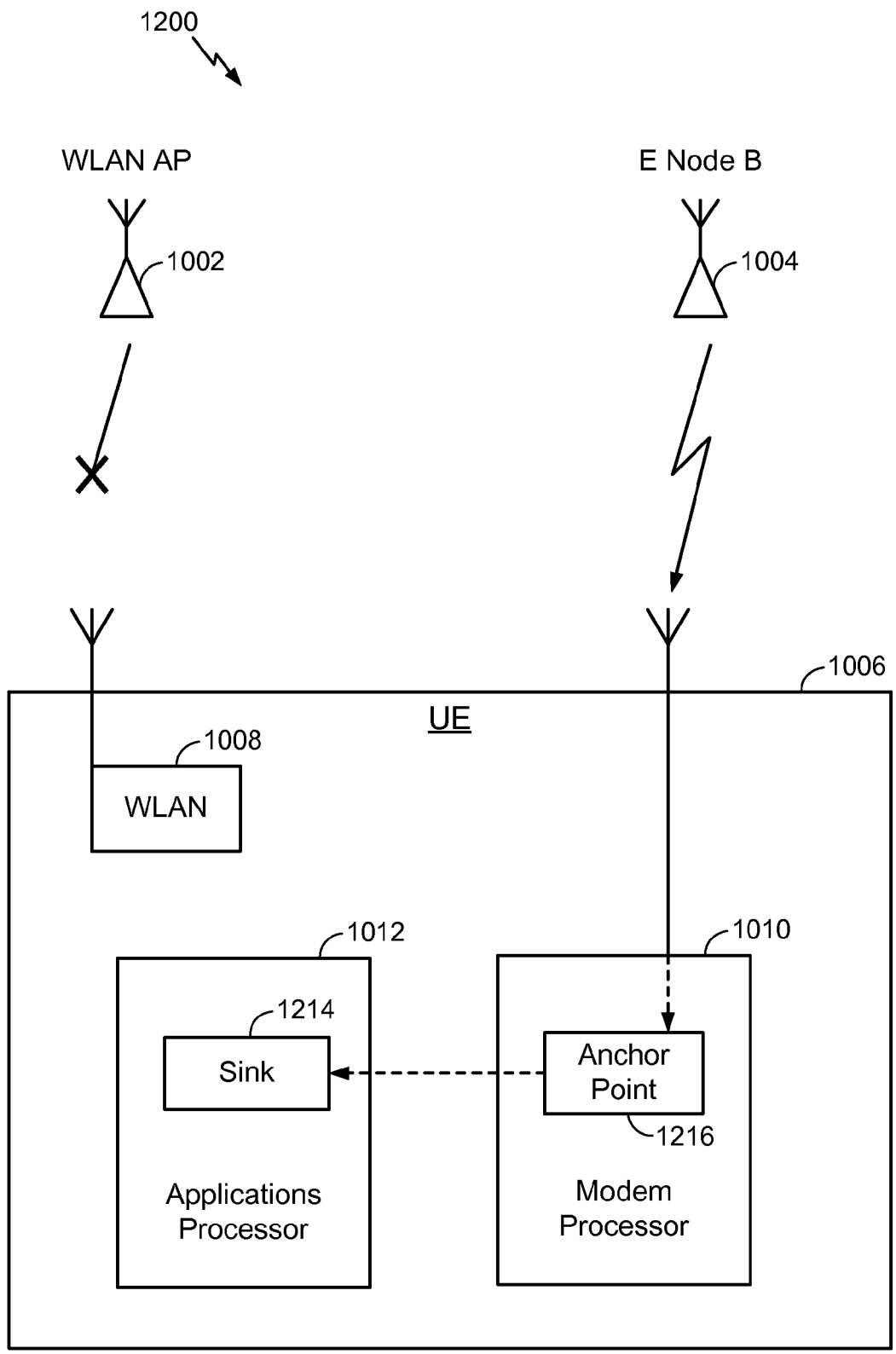
FIG. 12 illustrates a data path in which the UE receives data from only the WWAN and where the data sink is located at the applications processor.

FIG. 12 illustrates a data path 1200 in which the UE 1006 receives data from only the eNB 1004 while the WLAN may be inactive, and where the data sink 1214 is located at the applications processor 1012. Since the data packets from the eNB 1004 are processed at the modem processor, and since the sink is in the applications processor 1012, both the modem processor 1010 and the applications processor 1012 remain active causing increased load on the DDR memory and increased bandwidth and power consumption.

Figure 13:
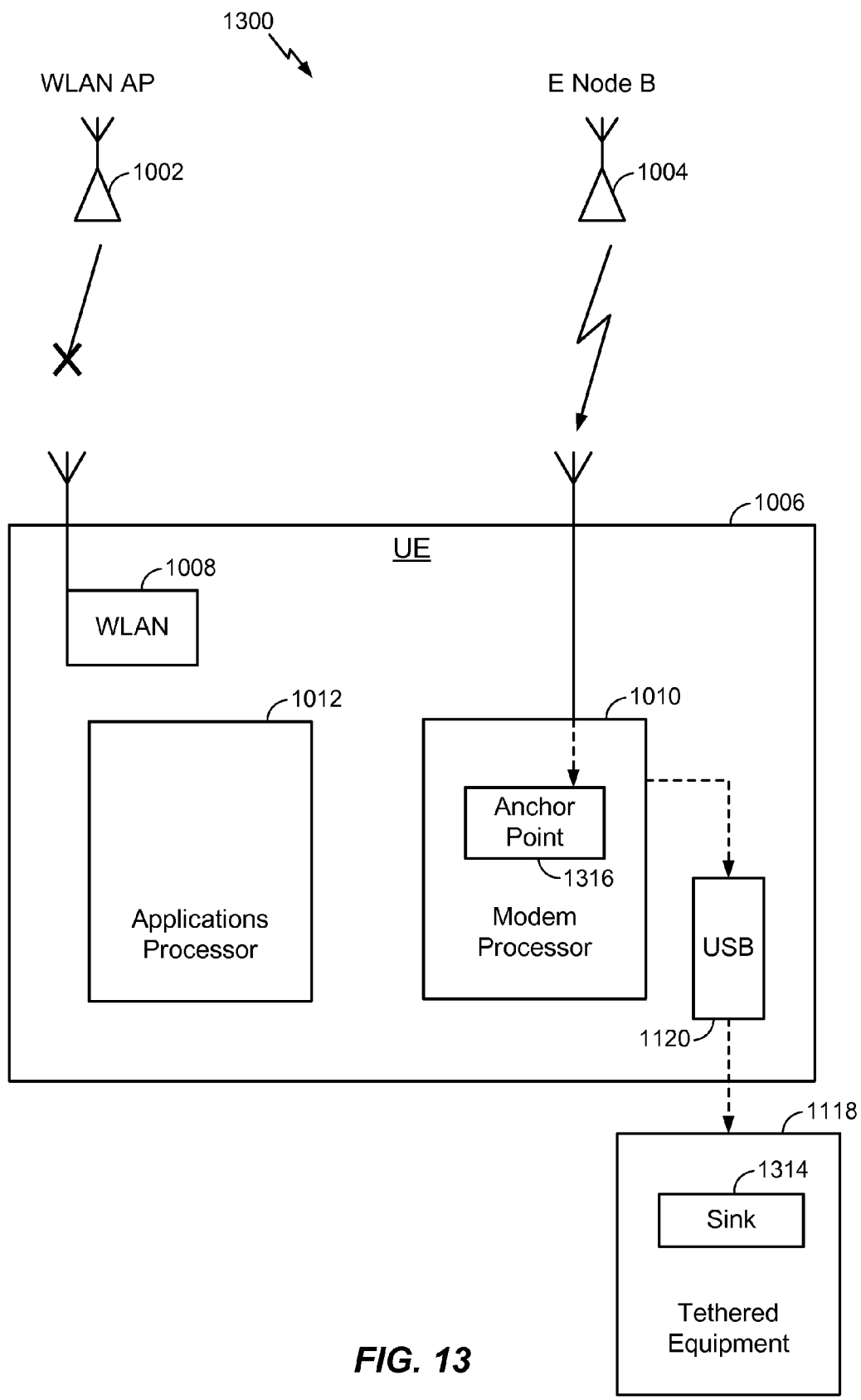
FIG. 13 illustrates a data path in which the UE receives data from only the WWAN and where the data sink is located at the modem processor.

FIG. 13 illustrates a data path 1300 in which the UE 1006 receives data from only the eNB 1004 while the WLAN may be inactive, and where the data sink 1314 is located at the tethered equipment 1118. Since the data packets from the eNB 1004 are processed at the modem processor, the modem processor 1010 remains awake. In this scenario, the applications processor 1012 may be collapsed when not in use due to other traffic or user activity. Alternatively, the applications processor 1012 may remain on due to other traffic or due to user activity.

Figure 14:
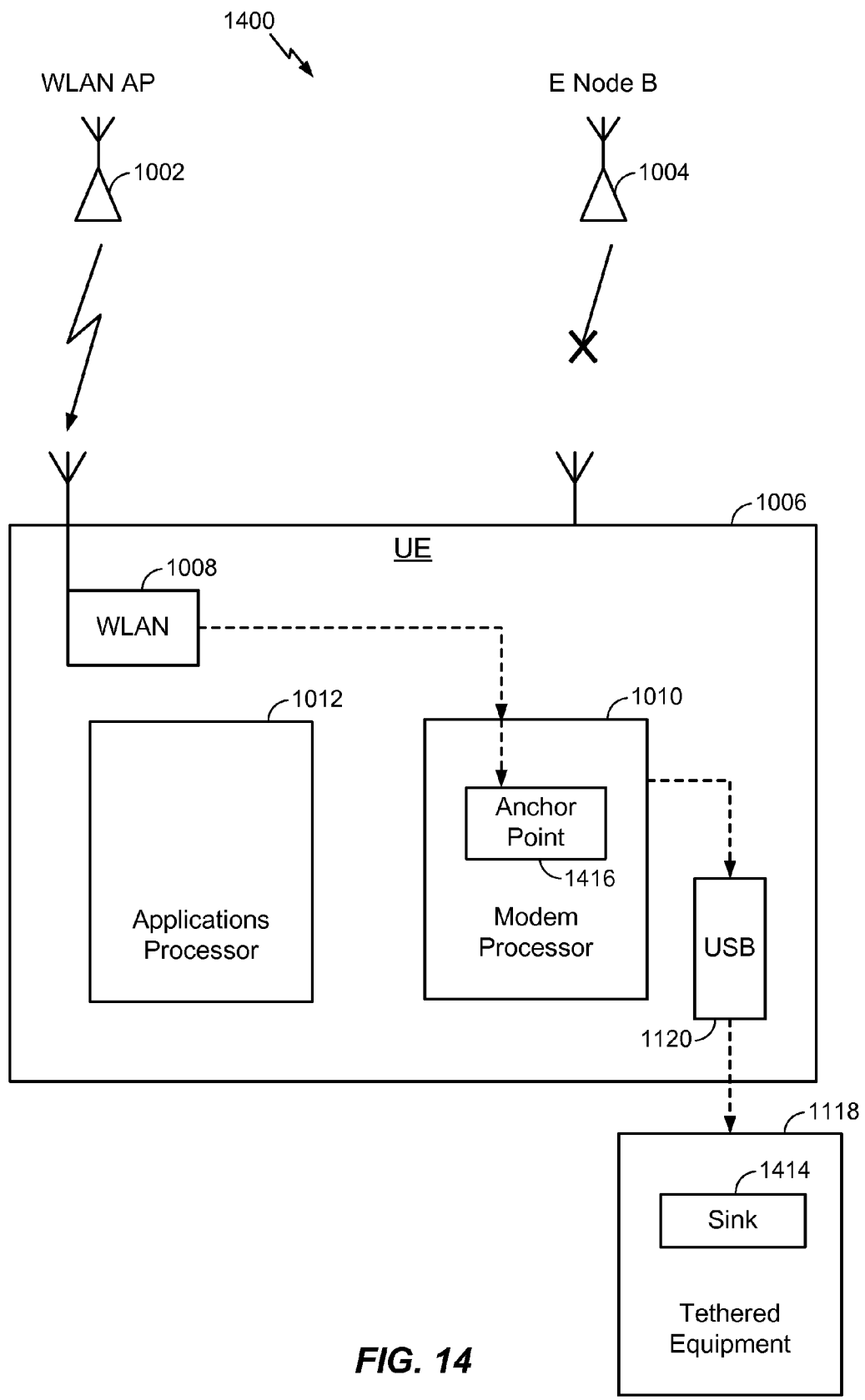
FIG. 14 illustrates a data path in which the UE receives data from only the WLAN and where the data sink is located at the tethered equipment.
Figure 15:
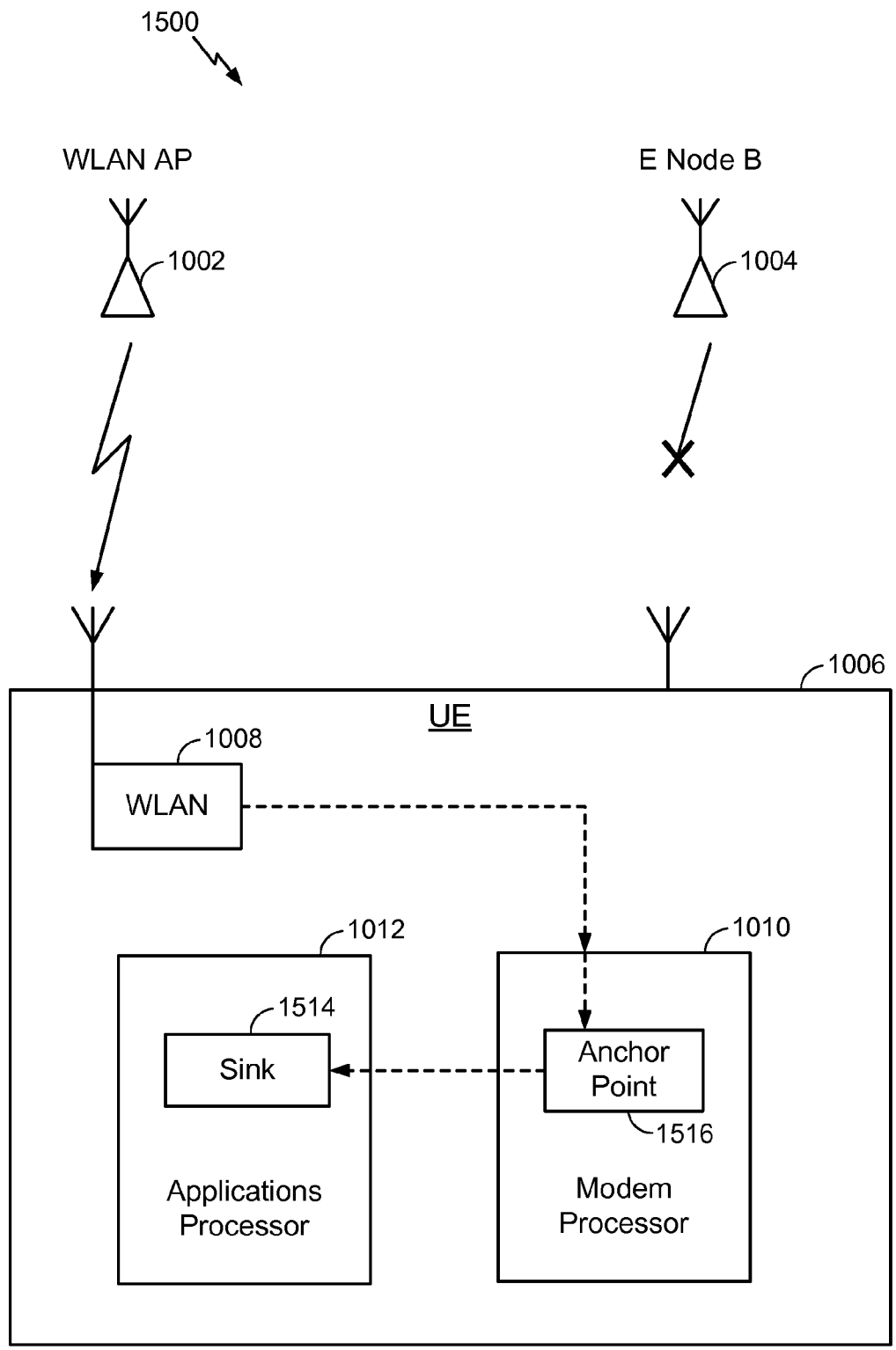
FIG. 15 illustrates a data path in which the UE receives data from only the WLAN and where the data sink is located at the applications processor.

FIG. 10-13 illustrates scenarios where the WWAN interface is active, and, thus, the modem processor 1010 remains awake. However, when the WWAN interface is inactive, if packets intended for the applications processor are being received only on the WLAN air interface 1008, the modem processor 1010 may be kept up for the purpose of processing PDCP packets, which increases the power and bandwidth consumption of the device. FIGS. 14-15 illustrate scenarios where routing packets directly first to the modem processor 1010 may be undesirable (e.g., inefficient in terms of bandwidth utilization and/or power consumption).

FIG. 14 illustrates a data path 1400 in which the WLAN air interface 1008 is active and WWAN is inactive, and where the location of the data sink 1414 is at the tethered equipment 1118. As shown in FIG. 14, the data packets received at the WLAN air interface 1008 are routed to the anchor point 1416 at the modem processor 1010 and then to the data sink 1414 at the tethered equipment 1118 via the USB interface 1120. In this scenario, although the applications processor 1012 can be collapsed unless active for other use cases, the modem processor 1010 remains awake, even though there are no packets from the eNB 1004 for it to process.

FIG. 15 illustrates a data path 1500 in which the WLAN air interface 1008 is active RAT and WWAN is inactive, and where the location of the data sink 1514 is at the applications processor 1012. As shown in FIG. 15, the data packets received at the WLAN air interface 1008 are routed to the anchor point 1516 at the modem processor 1010 and then to the data sink 1514 at the applications processor 1012. In this scenario, both the modem processor 1010 and the applications processor 1012 remain awake, even though there are no packets from the eNB 1004 for it to process and the data sink is in the applications processor.

Therefore, techniques for dynamically selecting a location, within the UE, as an anchor point for processing packets based, at least in part, on operating states of the first and second RATs are desirable in order to increase efficiency. For example, if data packets are being sent in the WiFi RAT, the anchor point may be moved to the applications processor instead of sending the PDCP packets to the modem processor first.

According to certain aspects, techniques are provided herein for dynamically selecting a location, within a UE capable of communicating via first and second RATs, as an anchor point for processing packets based, at least in part, on operating states of the RATs.

Figure 16:
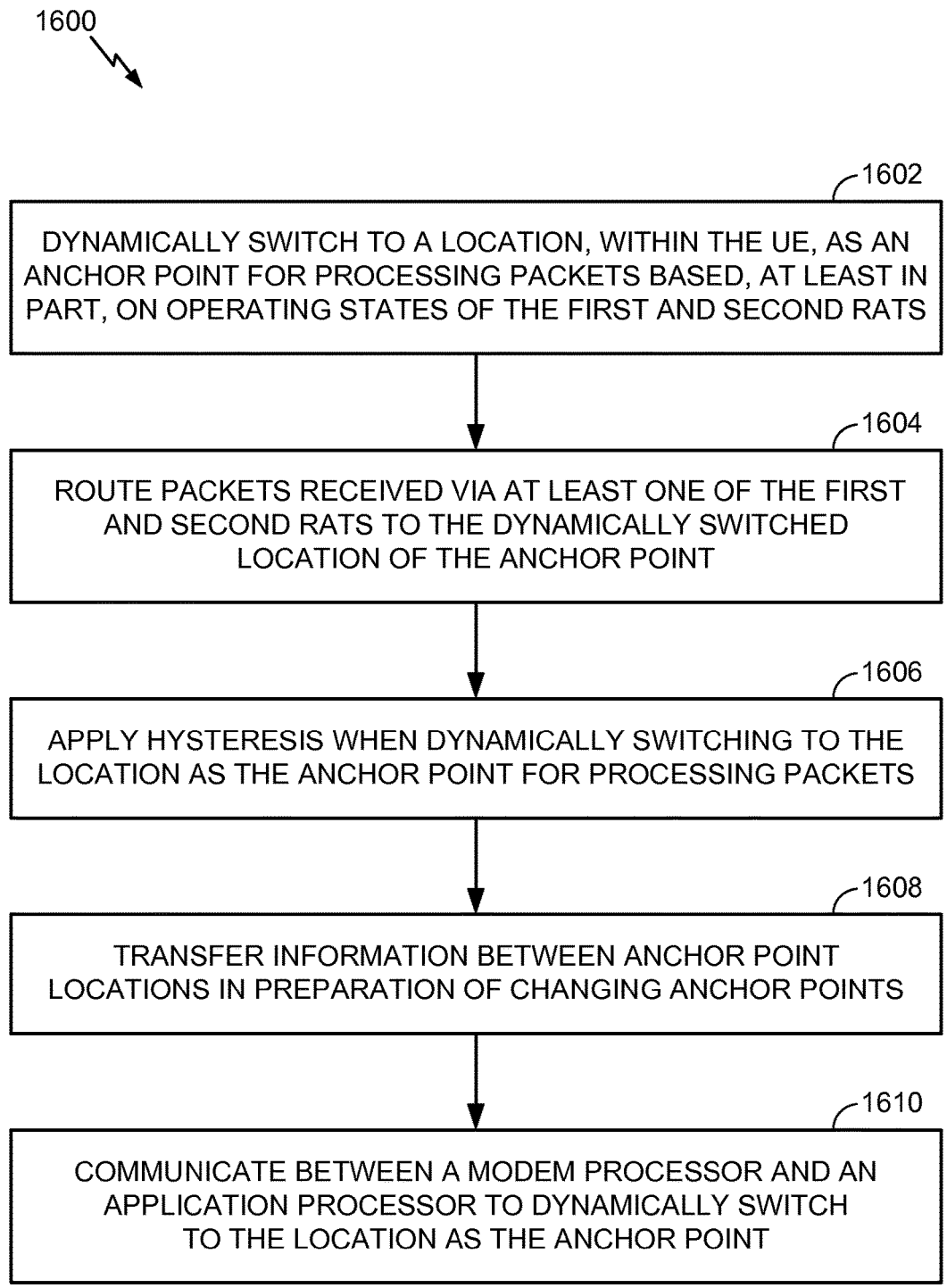
FIG. 16 is a flow chart illustrating example operations for wireless communications by a UE, in accordance with certain aspects of the present disclosure.

FIG. 16 is a flow chart illustrating example operations 1600 for wireless communications, in accordance with certain aspects of the present disclosure. The operations 1600 may be performed, for example, by a UE (e.g., UE 120) capable of communicating via first and second RATs (e.g., WWAN and WLAN). The operations 1600 may include, at 1602, switching to a location (e.g., between the applications processor and the modem processor), within the UE, as an anchor point for processing packets (e.g., PDCP processing) based, at least in part, on operation states of the first and second RATs. As will be discussed in more detail below with respect to FIGS. 17-23, for example, the switching may be based on whether the UE is actively communicating via the first RAT, the second RAT, or both. The switching may be further based on a destination (data sink) of the packets, based on whether a direct link exists between the applications processor, modem processor, and/or tethered equipment, and/or based on which location may be more efficient for processing the packets.

At 1604, the UE may route packets received via at least one of the first and second RATs to the dynamically switched location of the anchor point.

Optionally, at 1606, the UE may apply hysteresis when dynamically switching to the location as the anchor point for processing packets. For example, hysteresis may be applied whenever there is a change in parameters that would force the change in the anchor point. Applying hysteresis may include initializing a timer when parameters for switching to a new location for an anchor point are met and routing packets to the new location for the anchor point only after the timer has expired and the parameters are still met.

Optionally, at 1608, the UE may transfer information between anchor point locations in preparation of changing anchor points. Optionally, at 1610, the UE may communicate between a modem processor 1010 and an applications processor 1012 to dynamically switch to the location as the anchor point. As a part of the switching, all information needed to successfully switch processing of ensuing PDCP packets from the modem processor to the applications processor, or vice versa, have to be handed over to the other side. For example, the information may include context of the packets, one or more packets, the frame number, how many packets were not properly received, or security information like PDCP deciphering keys. The information may be periodically transferred between anchor point locations to speed processing after changing anchor points. This may also include some packets that were received out of order and are pending processing because the preceding packet was not received. In this case, the transfer of information may be partial since the information being transferred may be a difference between what information was transferred before and any new information, and wherein the information comprises context information. This information may not have been passed up to upper layers and, therefore, may be sent when switching the anchor from one layer to another. Thus, all the information that forms the PDCP state may be moved to the other side.

FIGS. 17-20 illustrate dynamically switching of anchor point location based on changing operating parameters of the system.

Figure 17:
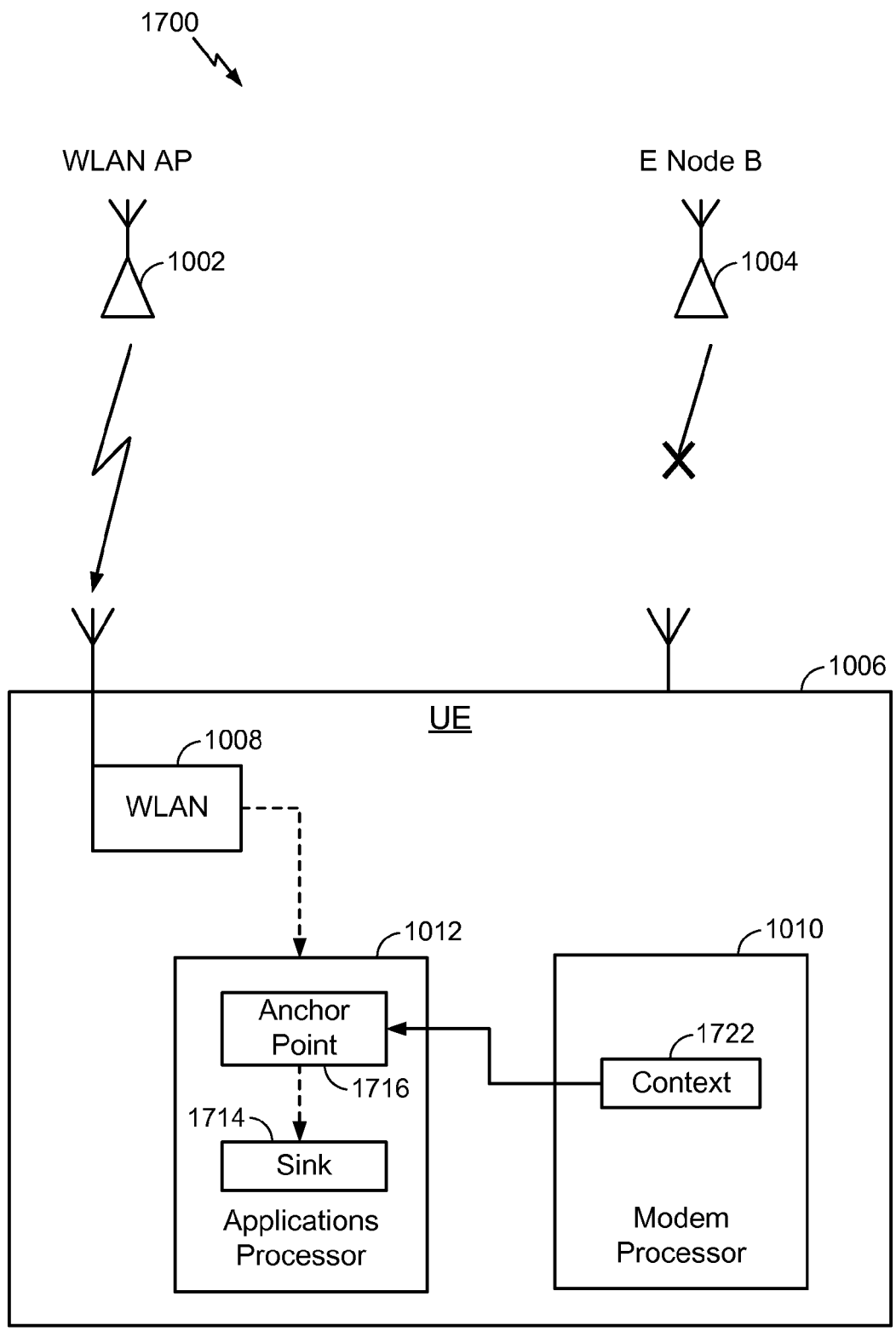
FIG. 17 illustrates an example data path for an example system configuration and operation parameters where the UE is actively communicating via WLAN, WWAN is inactive, and the sink is in the applications processor, in accordance with certain aspects of the present disclosure.

FIG. 17 illustrates an example data path 1700 for an example system configuration and operation parameters where the UE is actively communicating via WLAN, WWAN is inactive, and the sink is in the applications processor, in accordance with certain aspects of the present disclosure. In this scenario, the UE 1006 is no longer receiving LTE data packets from eNB 1004. Since there are no LTE packets and the data sink 1714 is located in the applications processor 1012, the UE 1006 may dynamically switch the location of the anchor point 1716 to the applications processor 1012. By dynamically switching the location for processing data packets, data packets can be processed closest to the intended recipient, optimizing the data processing process.

According to certain aspects, inter-processor communication between the modem processor 1010 and the applications processor 1012 may performed as part of dynamically switching the location of the anchor point 1716, for example, between a PDCP Anchor Manager of the modem processor 1010 and the applications processor 1012. The inter-processor communication may include a context 1722 handoff in order to obtain all information needed to successfully process incoming PDCP data packets. The context information may include, for example, frame number, hyperframe number, number of packets, and/or packets that were received out of order and are pending processing because the preceding packet was not received. According to certain aspects, the context information may be sent prior to switching the location of the anchor point, for example, periodically. In this case, when dynamically switching the location of the anchor point, only context information that is new or that has changed may be sent.

According to certain aspects, once the location of the anchor point 1716 for PDCP data packet processing has been dynamically switched to the applications processor 1012 and context handoff is complete, data packets no longer have to be routed through the modem processor 1010 and the modem processor 1010 can be collapsed.

Figure 18:
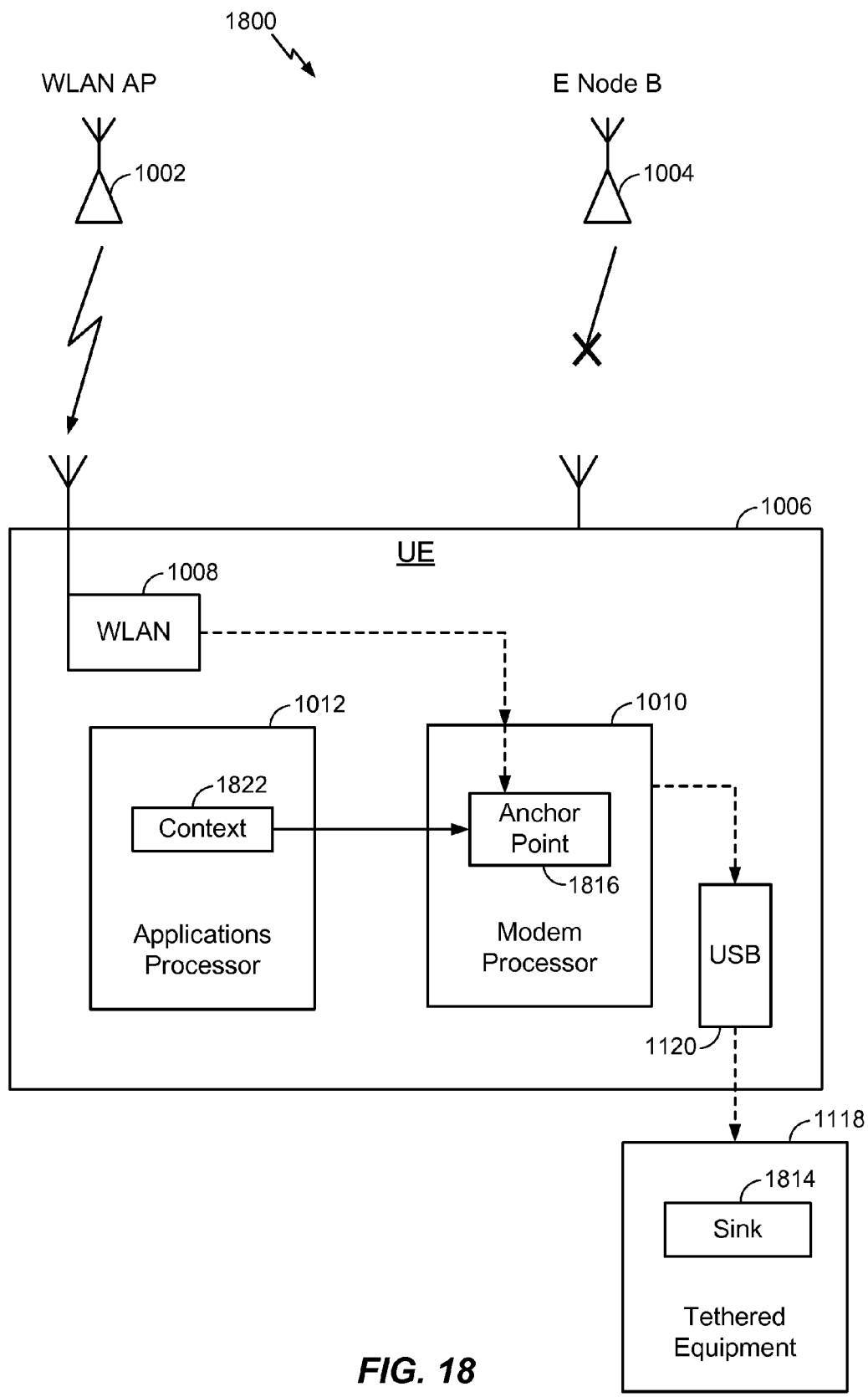
FIG. 18 illustrates an example data path for an example system configuration and operation parameters where the UE is actively communicating via WLAN, WWAN is inactive, and the sink is in a tethered equipment, in accordance with certain aspects of the present disclosure.
Figure 19:
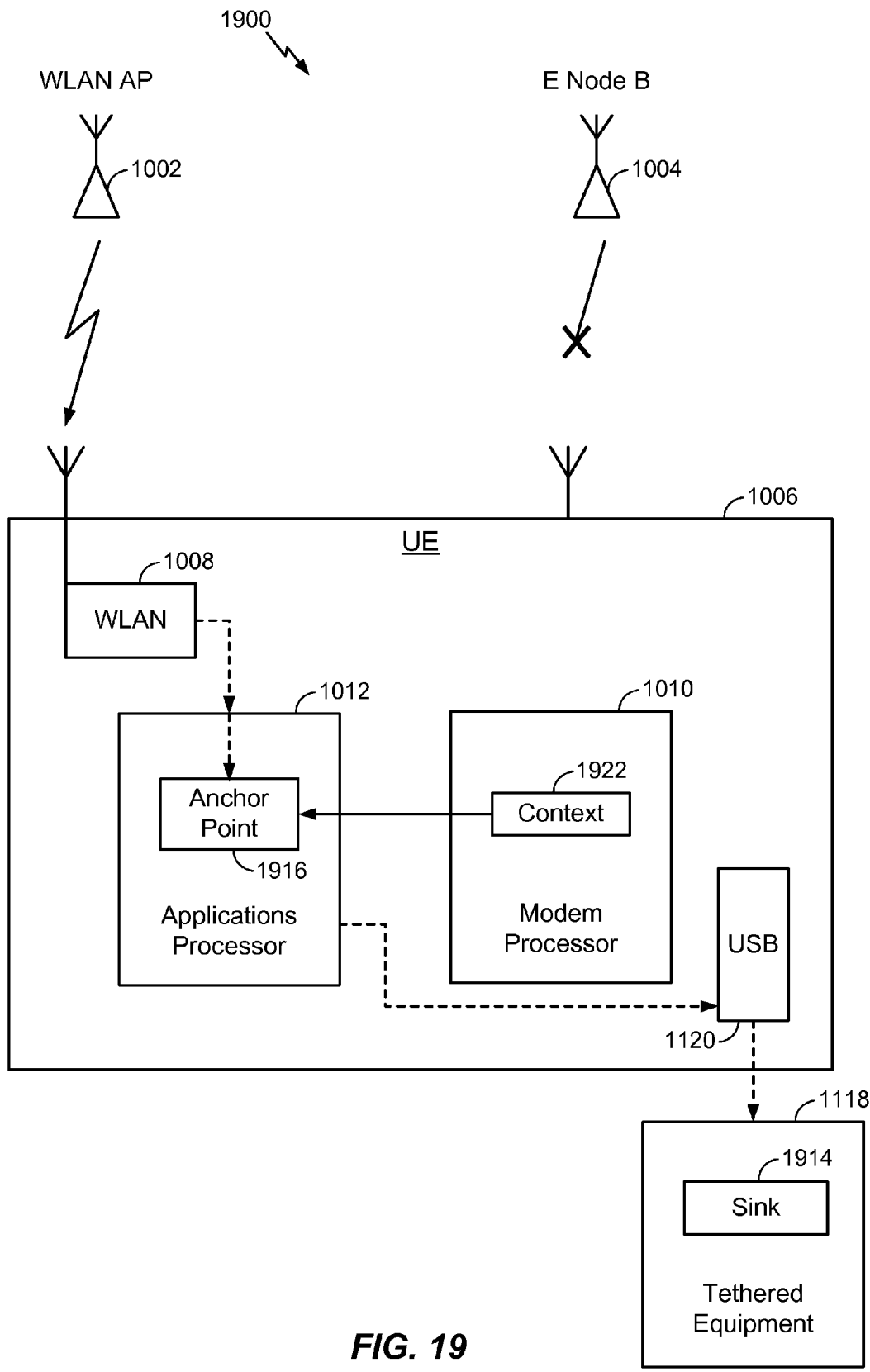
FIG. 19 illustrates another example data path for the system configuration and operation parameters where the UE is actively communicating via WLAN, WWAN is inactive, and the sink is in a tethered equipment, in accordance with certain aspects of the present disclosure.

FIG. 18 illustrates an example data path 1800 for an example system configuration and operation parameters where the UE is actively communicating via WLAN, WWAN is inactive, and the sink is in a tethered equipment, in accordance with certain aspects of the present disclosure. The tethered equipment 1118 may communicate via interface 1120. Although shown in FIG. 18 as a universal serial bus (USB) interface, the interface 1120 may be any interference for tethered equipment, such as universal asynchronous receiver/transmitter (UART), peripheral component interconnect express (PCIE), WLAN, etc. As shown in FIG. 18, since location of the sink 1814 is at the tethered equipment 1118, and no longer in the applications processor 1012, the anchor point 1816 may be at the modem processor 1010—and the applications processor 1012 may be collapsed. Alternatively, as shown in FIG. 19, since the WWAN is inactive (e.g., the UE 1006 is not actively communicating with eNB 1004), the location of the anchor point 1916 may be dynamically switched to the applications processor 1012 if data processing in the applications processor 1012 is more efficient as compared to the modem processor 1010. In that case, context 1922 information may be handed over, and processing may occur in the applications processor 1012. Data packets may then be transmitted to its intended destination in the device tethered 1118 bypassing the modem processor 1010 and increasing efficiency of the system. In this case, the modem processor 1010 may be collapsed.

Figure 20:
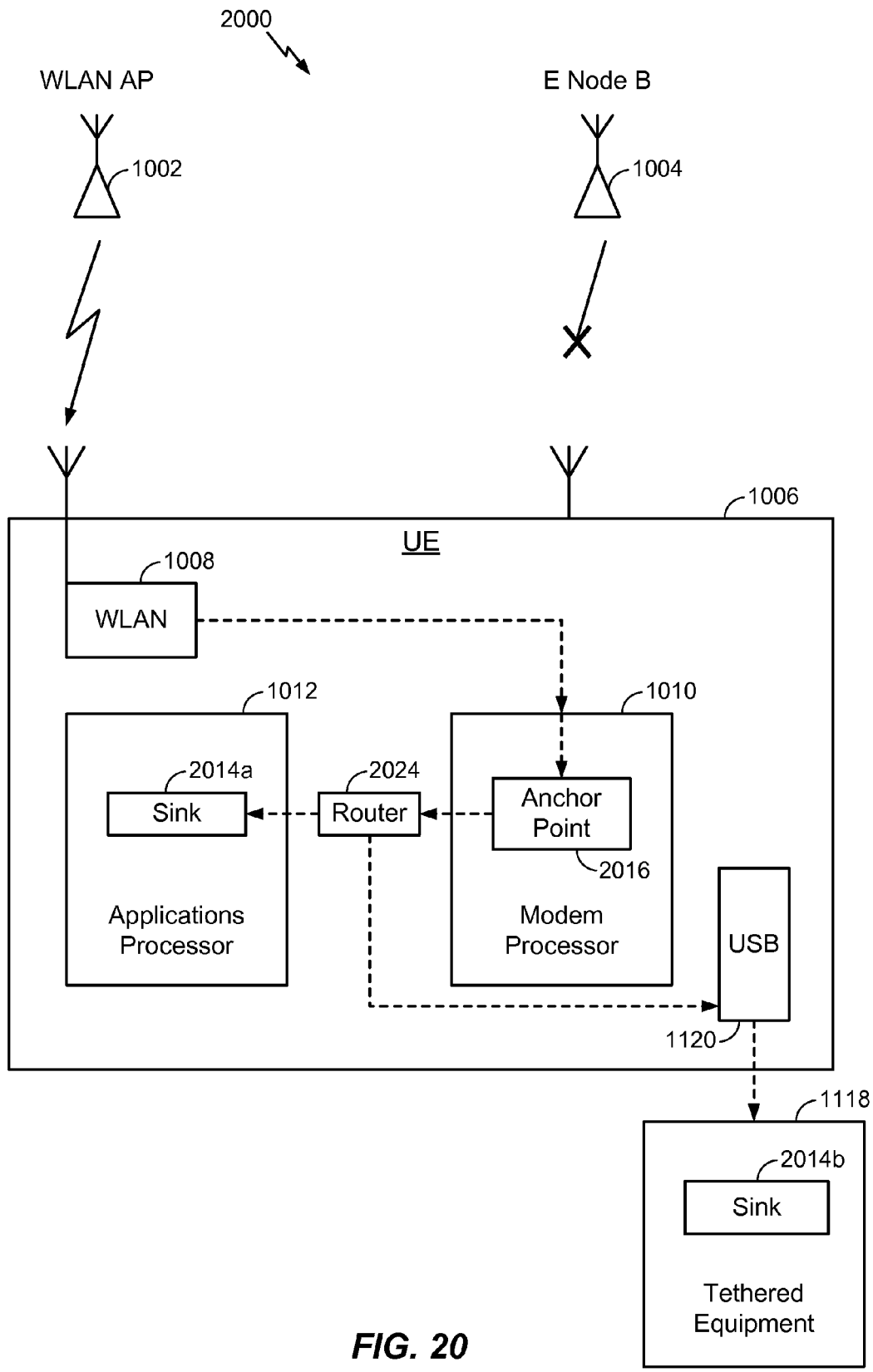
FIG. 20 illustrates an example data path for an example system configuration and operation parameters where the UE is actively communicating via WLAN, WWAN is inactive, and a sink is in both the tethered equipment and the applications processor, in accordance with certain aspects of the present disclosure.

FIG. 20 illustrates an example data path 2000 for an example system configuration and operation parameters where the UE is actively communicating via WLAN, WWAN is inactive, and a sink 2014*a* is located in the applications processor 1012 and another sink 2014*b* is located in the tethered equipment 1118, in accordance with certain aspects of the present disclosure. As shown in FIG. 20, in this case, the anchor point 2016 may be located at the modem processor 1010 and a router 2024 may be used to identify a destination of the packets and route the packets to either the applications processor 1012 or the tethered equipment 1118.

FIG. 21 is an example truth table 2100 showing conditions for switching anchor point locations, in accordance with certain aspects of the present disclosure. The various parameters shown in truth table 2100 are merely exemplary. Other parameters may be used for determining when to switch the location of the anchor point as well as to determine the location to be used as the anchor point. As shown in the example truth table 2100, when the WWAN (e.g., eNB) is active, the location of the anchor point is always in the modem processor. When the WWAN is not active, and the WLAN is active, if the data sink is in the applications processor 1012, then the location of the anchor point is always in the applications processor 1012; however, if the data sink is in the tethered equipment, the location of the anchor point is based on other factors. For example, if there is no direct connection between the modem processor 1010 and the tethered equipment 1118 and/or no direct connection between the WLAN air interface and the modem processor 1010, then the location of the anchor is always in the applications processor 1012. Alternatively, if a direct connection exists between WLAN air interface and modem processor 1010 and between the modem processor 1010 and the tethered equipment, then the location of the anchor point may be in whichever of the modem processor 1010 or the applications processor 1012 is more efficient (e.g., uses less power to process the packets) for processing the packets.

According to certain aspects, hysteresis may be applied to dynamically switching the location of the anchor point. The switching algorithm may include a hysteresis whenever there is a change in parameters. Some parameters may force the change in anchor while some parameters may not impose a stringent condition that necessitates change in anchor. For example, even if certain conditions/parameters are met for switching the location of the anchor point, the anchor may not immediate change until certain conditions of the hysteresis are met. For example, if the conditions remain satisfied for a given period of time (e.g., expiry of a hysteresis time initialized when the conditions/parameters for switching are met). In another example where hysteresis is beneficial, switching may involve transferring packets which may not have been given to the upper layers yet, thus, hysteresis may be useful before completing a switch. One example of a forced change in anchor occurs when the LTE RAT turns ON and receives data packets is a trigger that will cause the change of anchor point immediately. A forced change may or may not use hysteresis when switching but, as discussed above, for a soft change hysteresis may be helpful. Another example where it would be beneficial to apply hysteresis is in a configuration where the applications processor is the anchor—assuming that the modem processor is more efficient than the applications processor in PDCP processing. This is shown in FIG. 21A where the WLAN is active and the sink is in the applications processor, and the anchor point is at the applications processor. If the above configuration switched to the configuration shown in FIG. 21B due to removal of the sink in the applications processor and addition of a sink in the tethered equipment (i.e., a soft change), then it may be desirable not to switch the anchor to modem processor before the hysteresis timer expires.

Figure 22:
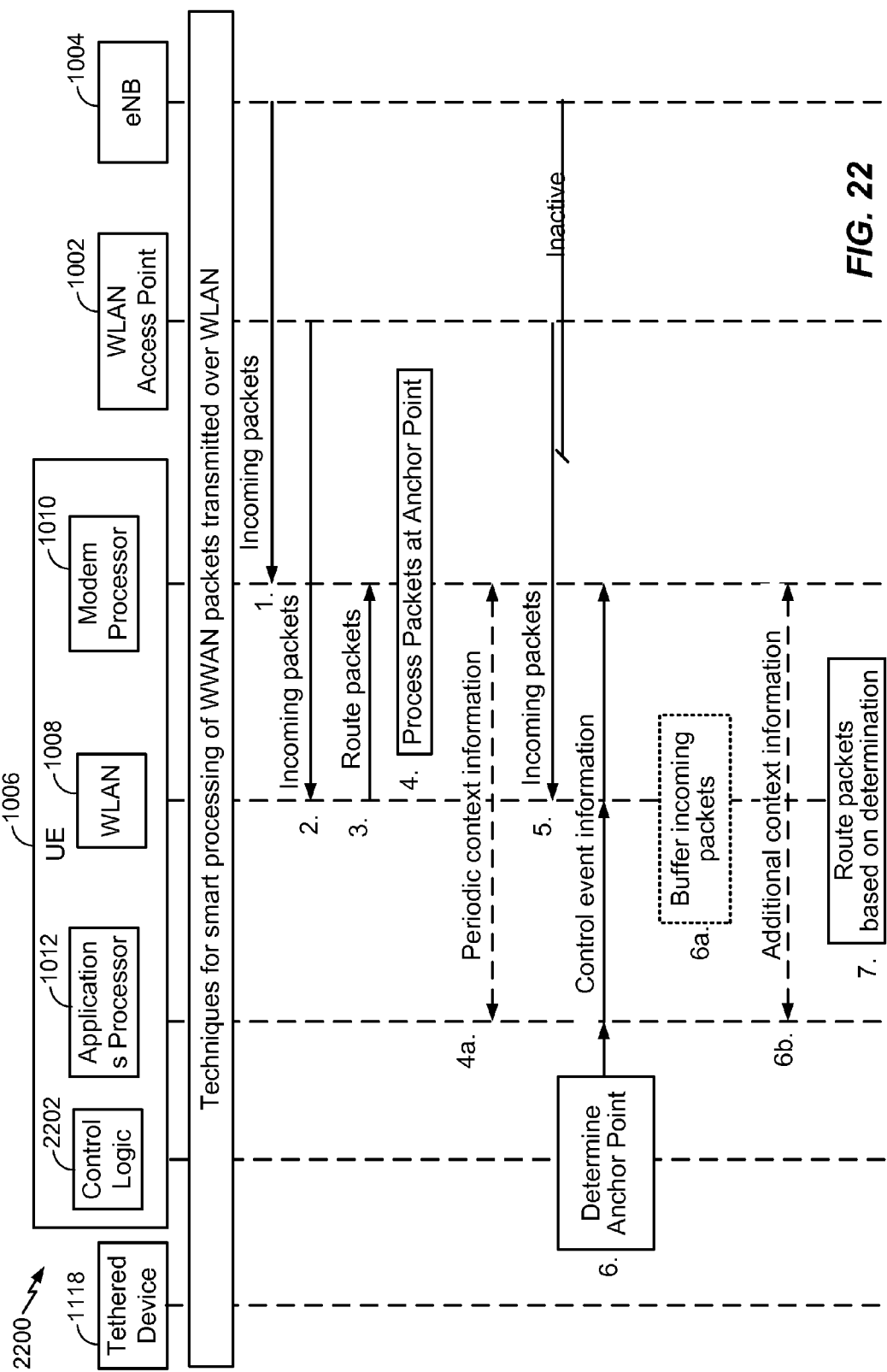
FIG. 22 is a call flow diagram illustrating example operations for switching an anchor point location, in accordance with certain aspects of the present disclosure.

FIG. 22 is a call flow 2200 diagram illustrating example operations for switching an anchor point location, in accordance with certain aspects of the present disclosure. As shown in the call flow 2200, at 1 and 2, the UE 1006 may be receiving incoming packets from both the WLAN AP 1002 and the eNB 1004. At 3, the UE 1006 may route the packets to the modem processor 1010 where the anchor point is currently located. At 4, the packets may be processed at modem processor 1010 (e.g., PDCP processing). Optionally, at 4*a*, a periodic exchange of context information may occur between the applications processor 1012 and the modem processor 1010. At 5, the UE 1006 may still be actively communicating with the WLAN AP 1002; however, the WWAN may be inactive. In this case, at 6, the control logic 2202 may determine a location for dynamically switching the anchor point. According to certain aspects, the control logic may be located in the modem processor 1010 or the applications processor 1012, for example. The control logic may send control events to the WLAN, the modem processor 1010, and/or the applications 1012 to coordinate the switching of the anchor point. According to certain aspects, the determination may be made based on any parameters shown in truth table 2100 or based on other parameters and/or hysteresis. According to certain aspects, optionally, during a transition period for switching the location of the anchor point, incoming packets may be buffered, at 6*a*, in the receiver (e.g., WLAN/modem processor) while the switch is in progress. Once the switch is complete, the buffered packets may be routed to the new anchor point location. This may avoid packets over the same RAT being received out of order by the anchor point. Otherwise, the anchor point may reorder the packets. At 6*b*, the applications processor 1012 and the modem processor 1010 may exchange any additional context information for processing the packets. For example, any new or changed information since the periodic exchange of context information. At 7, the UE 1006 may route the packets to the selected anchor point, for example, based on the information received from the control logic 2202.

Figure 23:
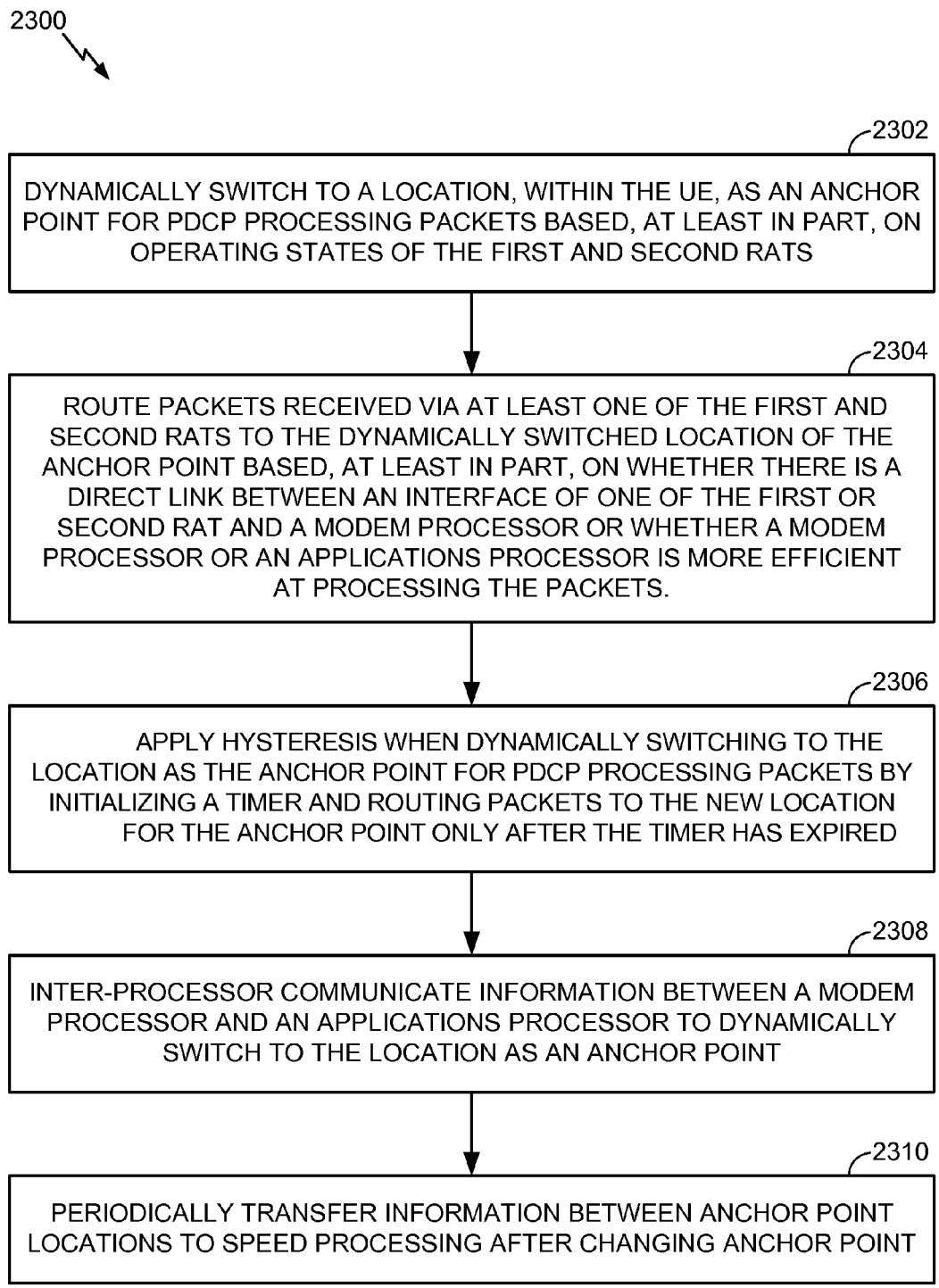
FIG. 23 is a flow chart illustrating example operations for switching an anchor point location, in accordance with certain aspects of the present disclosure.

FIG. 23 is a flow chart illustrating example operations 2300 for wireless communications, in accordance with certain aspects of the present disclosure. The operations 2300 may be performed, for example, by a UE (e.g., UE 120) capable of communicating via first and second RATs (e.g., WWAN and WLAN). The operations 2300 may include, at 2302, dynamically switching to a location, within the UE, as an anchor point for PDCP processing packets based, at least in part, on operating states of the first and second RATs.

At 2304, the UE may route packets receives via at least one of the first and second RATs to the dynamically switched location of the anchor point based, at least in part, on whether there is a direct link between an interface of one of the first or second RAT and a modem processor, based on whether the modem processor or an applications processor is more efficient at processing the packets, and/or based on efficiency of the forwarding path. For example, forwarding packets rom WLAN to modem processor may include copying the packet data from one address space to another, which may introduce additional bus bandwidth utilization and potentially higher power usage (e.g., to operate the bus infrastructure at higher frequency).

At 2306, the UE may apply hysteresis when dynamically switching to the location as the anchor point for PDCP processing packets by initializing a timer and routing packets to the new location for the anchor point only after the timer has expired.

At 2308, the UE communicate, inter-processor, information between the modem processor and the applications processor to dynamically switch to the location as the anchor point.

At 2310, the UE may periodically transfer information between the anchor point locations to speed processing after changing anchor points.

Figure 16A:
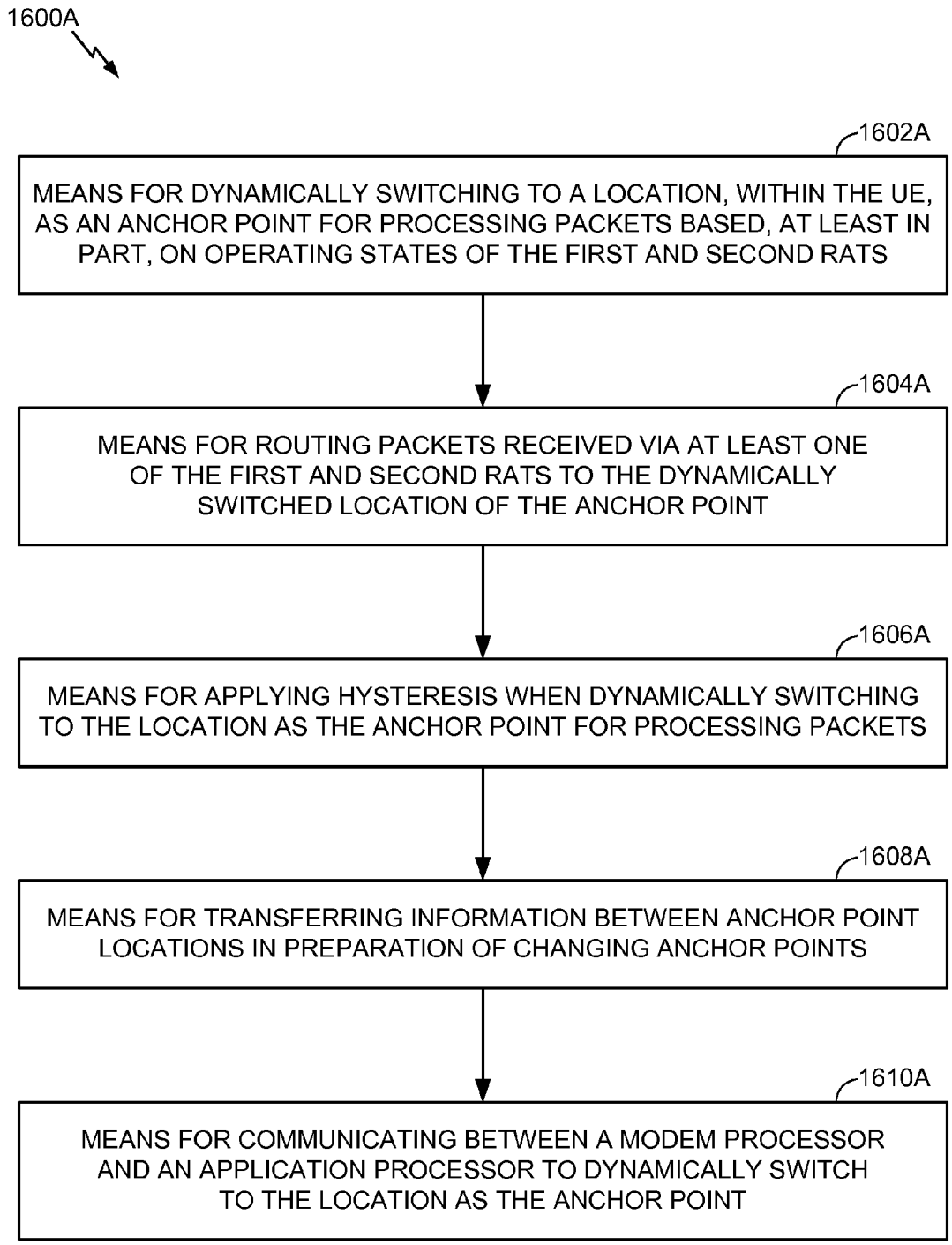
FIG. 16A illustrates example means capable of performing the operations shown in FIG. 16, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1600 illustrated in FIG. 16 correspond to means 1600A in FIG. 16A.

For example, means for transmitting, means for sending, means for signaling, and means for transferring, may comprise a transmitter and/or an antenna(s) antenna(s) 352 of the UE 120 illustrated in FIG. 3. Means for receiving may comprise a receiver and/or antenna(s) 352 of the UE 120 illustrated in FIG. 3.

Means for performing, means for switching, means for initializing, means for routing, means for processing, means for selecting, means for applying, and/or means for determining may comprise a processing system, which may include one or more processors, such as the TX MIMO Processor 366, the Transmit Processor 363, the Controller/Processor 380, and/or the Receive Processor 358 of the UE 120 illustrated in FIG. 3.

In some case, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c., as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE) capable of communicating via at least first and second radio access technologies (RATs), comprising:
   dynamically switching to a location, within the UE, as an anchor point for processing packets based, at least in part, on operating states of the first and second RATs, wherein the location of the anchor point is selected based, at least in part, on whether the UE is actively communicating via the first RAT, the second RAT, or both, and wherein the location of the anchor point is selected further based, at least in part, on a destination of the packets; and
   routing packets received via at least one of the first and second RATs to the dynamically switched location of the anchor point.

2. The method of claim 1, wherein the processing comprises at least one of packet data convergence protocol (PDCP) processing or reordering of the packets, and wherein the switching is between an applications processor and a modem processor.

3. The method of claim 1, wherein the location of the anchor point comprises a modem processor or an applications processor.

4. The method of claim 1, wherein the destination of the packets comprises at least one of: an applications processor or a device tethered to the UE.

5. The method of claim 4, wherein the device tethered to the UE is tethered via at a Universal Serial Bus (USB), Bluetooth, wireless local area network (WLAN), high speed inter-chip (HSIC), peripheral component interconnect express (PCIe), or a secure digital input/output (SDIO) interface.

6. The method of claim 1, wherein the location of the anchor point is selected based, at least in part, on whether there is a direct link between one of the first or second RAT and a modem processor.

7. The method of claim 1, wherein the location of the anchor point is selected based, at least in part, on whether there is a direct link between a modem processor and a device tethered to the UE.

8. The method of claim 1, wherein the location of the anchor point is selected based, at least in part, on whether a modem processor or an applications processor is more efficient at processing the packets.

9. The method of claim 1, wherein the location of the anchor point is selected based, at least in part, on efficiency of a forwarding path to a modem processor or an applications processor.

10. The method of claim 1, further comprising applying hysteresis when dynamically switching to the location as the anchor point for processing packets.

11. The method of claim 10, wherein hysteresis is applied whenever there is a change in parameters that would force the change in the anchor point.

12. The method of claim 1, further comprising applying hysteresis by:
    initializing a timer when parameters for switching to a new location for an anchor point are met; and
    routing packets to the new location for the anchor point after the timer has expired and the parameters are still met.

13. The method of claim 1, further comprising transferring information between anchor point locations in preparation of changing anchor points.

14. The method of claim 13, wherein the information comprises at least one of:
    context of the packets, one or more packets, or security information.

15. The method of claim 13, wherein information is periodically transferred between anchor point locations to speed processing after changing anchor points.

16. The method of claim 15, wherein a transfer of information may be partial since the information being transferred may be a difference between what information was transferred before and any new information, and wherein the information comprises context information.

17. The method of claim 1, further comprising inter-processor communication between a modem processor and an applications processor to dynamically switch to the location as the anchor point.

18. The method of claim 1, wherein:
    the first RAT comprises a wireless local area network (WLAN); and
    the second RAT comprises a wireless wide area network (WWAN).

19. An apparatus for wireless communications by a user equipment (UE) capable of communicating via at least first and second radio access technologies (RATs), comprising:
    at least one processor configured to:
        dynamically switch to a location, within the UE, as an anchor point for processing packets based, at least in part, on operating states of the first and second RATs, wherein the location of the anchor point is selected based, at least in part, on whether the UE is actively communicating via the first RAT, the second RAT, or both, and wherein the location of the anchor point is selected further based, at least in part, on a destination of the packets; and route packets received via at least one of the first and second RATs to the dynamically switched location of the anchor point; and a memory coupled with the at least one processor.

20. The apparatus of claim 19, wherein the processing comprises at least one of packet data convergence protocol (PDCP) processing or reordering of the packets, and wherein the switching is between an applications processor and a modem processor.

21. The apparatus of claim 19, wherein the destination of the packets comprises at least one of: an applications processor or a device tethered to the UE.

22. The apparatus of claim 21, wherein the device tethered to the UE is tethered via at a Universal Serial Bus (USB), Bluetooth, wireless local area network (WLAN), high speed inter-chip (HSIC), peripheral component interconnect express (PCIe), or a secure digital input/output (SDIO) interface.

23. The apparatus of claim 19, wherein the location of the anchor point is selected based, at least in part, on whether there is a direct link between one of the first or second RAT and a modem processor.

24. The apparatus of claim 19, wherein the location of the anchor point is selected based, at least in part, on whether there is a direct link between a modem processor and a device tethered to the UE.

25. The apparatus of claim 19, wherein the location of the anchor point is selected based, at least in part, on whether a modem processor or an applications processor is more efficient at processing the packets.

26. The apparatus of claim 19, wherein the location of the anchor point is selected based, at least in part, on efficiency of a forwarding path to a modem processor or an applications processor.

* * * * *